(12) United States Patent
Tsuda et al.

(10) Patent No.: US 12,515,683 B2
(45) Date of Patent: Jan. 6, 2026

(54) INFORMATION PROCESSING SYSTEM, INFORMATION PROCESSING DEVICE, AND INFORMATION PROCESSING METHOD

(71) Applicant: SONY GROUP CORPORATION, Tokyo (JP)

(72) Inventors: Shinichiro Tsuda, Tokyo (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 191 days.

(21) Appl. No.: 18/001,660

(22) PCT Filed: May 28, 2021

(86) PCT No.: PCT/JP2021/020325
§ 371 (c)(1),
(2) Date: Dec. 13, 2022

(87) PCT Pub. No.: WO2021/261167
PCT Pub. Date: Dec. 30, 2021

(65) Prior Publication Data
US 2023/0234599 A1 Jul. 27, 2023

(30) Foreign Application Priority Data
Jun. 26, 2020 (JP) ................. 2020-110588

(51) Int. Cl.
*B60W 50/04* (2006.01)
*B60W 50/00* (2006.01)
(Continued)

(52) U.S. Cl.
CPC .......... *B60W 50/04* (2013.01); *B60W 60/001* (2020.02); *H04W 4/40* (2018.02); *B60W 2050/0028* (2013.01)

(58) Field of Classification Search
CPC ............... B60W 50/04; B60W 60/001; B60W 2050/0028; B60W 2050/0064;
(Continued)

(56) References Cited

U.S. PATENT DOCUMENTS 8,718,861 B1 * 5/2014 Montemerlo ..... B60W 60/0053
701/411
2018/0220948 A1 * 8/2018 Kojima .................... A61B 5/11
(Continued)

FOREIGN PATENT DOCUMENTS

JP  2013-246740 A  12/2013
JP  2017-146934 A  8/2017
(Continued)

OTHER PUBLICATIONS

Level 0 to 5: steps in autonomous driving (Year: 2022).*
(Continued)

*Primary Examiner* — Anne Marie Antonucci
*Assistant Examiner* — Luis G Del Valle
(74) *Attorney, Agent, or Firm* — CHIP LAW GROUP

(57) ABSTRACT

There is provided an information processing system capable of performing driving assistance according to different automated driving levels.
An information processing system according to an embodiment of the present disclosure includes one or more mobile devices capable of setting an automated driving level, and an external network device capable of communicating with the mobile devices. The external network device includes a communication device that communicates with the mobile device, an arithmetic model determination device that determines an arithmetic model corresponding to the automated driving level and provides the arithmetic model to the mobile device via the communication device, and a registration determination device that determines whether or not
(Continued)

registration of the automated driving level is possible on the basis of information regarding possession of the arithmetic model, and gives a notification of registration permission to the mobile device via the communication device. The mobile device includes an arithmetic model request unit that requests the arithmetic model from the arithmetic model determination device, and causes the information to be transmitted to the registration determination device when the requested arithmetic model is provided, and a movement control unit that starts movement control based on the automated driving level permitted to be registered when the notification is received from the registration determination device.

18 Claims, 12 Drawing Sheets

(51) Int. Cl.
*B60W 60/00* (2020.01)
*H04W 4/40* (2018.01)

(58) Field of Classification Search
CPC ......... B60W 2556/15; B60W 2556/45; B60W 60/0015; H04W 4/40; H04W 4/02; G08G 1/00; G08G 1/09
See application file for complete search history.

(56) References Cited

U.S. PATENT DOCUMENTS

| | | | |
|---|---|---|---|
| 2018/0299896 A1* | 10/2018 | Fujimura | B60W 50/082 |
| 2020/0207346 A1* | 7/2020 | Tsuji | B60W 30/12 |
| 2020/0385016 A1* | 12/2020 | Noguchi | G08G 1/096811 |
| 2021/0203840 A1* | 7/2021 | Shinohara | H04N 7/18 |
| 2021/0216066 A1* | 7/2021 | Shimotani | G05D 1/0011 |
| 2021/0286372 A1* | 9/2021 | Sakai | G05D 1/0214 |
| 2022/0011768 A1* | 1/2022 | Matsunaga | G05D 1/0011 |
| 2022/0048432 A1* | 2/2022 | Switalski | G08G 1/205 |
| 2022/0126878 A1* | 4/2022 | Moustafa | B60W 50/0097 |
| 2023/0020471 A1* | 1/2023 | Kume | G08G 1/16 |

FOREIGN PATENT DOCUMENTS

| | | |
|---|---|---|
| JP | 2017-174355 A | 9/2017 |
| JP | 2017-218019 A | 12/2017 |
| JP | 2018-163613 A | 10/2018 |
| JP | 2019-177807 A | 10/2019 |

OTHER PUBLICATIONS

International Search Report and Written Opinion of PCT Application No. PCT/JP2021/020325, issued on Aug. 17, 2021, 09 pages of ISRWO.

* cited by examiner

INFORMATION PROCESSING SYSTEM, INFORMATION PROCESSING DEVICE, AND INFORMATION PROCESSING METHOD

CROSS REFERENCE TO RELATED APPLICATIONS

This application is a U.S. National Phase of International Patent Application No. PCT/JP2021/020325 filed on May 28, 2021, which claims priority benefit of Japanese Patent Application No. JP 2020-110588 filed in the Japan Patent Office on Jun. 26, 2020. Each of the above-referenced applications is hereby incorporated herein by reference in its entirety.

TECHNICAL FIELD

The present disclosure relates to an information processing system, an information processing device, and an information processing method.

BACKGROUND ART

In recent years, various sensors are mounted on vehicles, and functions for assisting driving are being introduced. Furthermore, the IEEE has developed a communication system for vehicle-to-vehicle communication called Dedicated Short Range Communication (DSRC) based on 802.11p, and further, also 3GPP has formulated a C-V2X standard based on Long Term Evolution (LTE) Device to Device (D2D) communication in Rel-14. Introduction of an advanced safe driving system called advanced driver-assistance systems (ADAS) by this inter-vehicle communication and sensor fusion using various sensors mounted on vehicles is starting. Moreover, it is expected to achieve fully automated driving without intervention by human operation using artificial intelligence (AI), machine learning (ML), or deep learning (DL).

CITATION LIST

Patent Document

Patent Document 1: Japanese Patent Application Laid-Open No. 2017-174355

SUMMARY OF THE INVENTION

Problems to be Solved by the Invention

Several levels are defined for the above-described automated driving according to the degree of human intervention, and vehicles compatible with various levels of automated driving coexist until all vehicles are compatible with fully automated driving that does not require a steering wheel and an accelerator, which are defined as level 5 by the Society of Automotive Engineers (SAE) International. In such a situation, in order to provide mobility as a service (MaaS), driving assistance corresponding to different automated driving levels is required.

The present disclosure provides an information processing system, an information processing device, and an information processing method capable of providing driving assistance according to different automated driving levels.

Solutions to Problems

An information processing system according to an embodiment of the present disclosure includes one or more mobile devices capable of setting an automated driving level, and an external network device capable of communicating with the mobile devices, in which the external network device includes
a communication device that communicates with the mobile device,
an arithmetic model determination device that determines an arithmetic model corresponding to the automated driving level and provides the arithmetic model to the mobile device via the communication device, and
a registration determination device that determines whether or not registration of the automated driving level is possible on the basis of information regarding possession of the arithmetic model, and gives a notification of registration permission to the mobile device via the communication device, and
the mobile device includes
an arithmetic model request unit that requests the arithmetic model from the arithmetic model determination device, and causes the information to be transmitted to the registration determination device when the requested arithmetic model is provided, and
a movement control unit that starts movement control based on the automated driving level permitted to be registered when the notification is received from the registration determination device.

Furthermore, the communication device may be a base station device that wirelessly communicates with the mobile device.

Furthermore, the arithmetic model determination device may be a server including a communication unit that communicates with the mobile device via the base station device.

Furthermore, the registration determination device may be a driving management device including a communication unit that communicates with the mobile device via the base station device.

Furthermore, the mobile device may further include an arithmetic model determination unit that confirms an expiration date or a valid area of a first arithmetic model owned, and the arithmetic model request unit may request a second arithmetic model whose date or area is valid according to a confirmation result of the arithmetic model determination unit.

Furthermore, the mobile device may further include an arithmetic model storage unit that stores the arithmetic model, and the first arithmetic model may be updated to the second arithmetic model in the arithmetic model storage unit.

Furthermore, the registration determination device may further include a compatibility test execution instruction unit that determines necessity of a compatibility test according to the automated driving level and instructs the mobile device to execute the compatibility test according to a determination result.

Furthermore, the registration determination device may further include a registration permission determination unit that gives an instruction on a setting change of the automated driving level on the basis of a position of the mobile device, and the mobile device may further include an automated driving level setting unit that changes a setting of the automated driving level on the basis of the instruction from the registration permission determination unit.

Furthermore, the arithmetic model request unit may request the arithmetic model corresponding to the automated driving level with changed setting from the arithmetic model determination device, and may update a first arithmetic model owned to a second arithmetic model acquired from the arithmetic model determination device.

Furthermore, the compatibility test execution instruction unit may instruct the mobile device to execute the compatibility test that is periodic in a case where the automated driving level is equal to or higher than a predetermined level.

An information processing device according to an embodiment of the present disclosure includes:
- an arithmetic model request unit that requests and acquires an arithmetic model corresponding to an automated driving level set in a mobile device; and
- a movement control unit that, when the automated driving level is permitted to be registered on the basis of information regarding possession of the arithmetic model, starts movement control of the mobile device on the basis of the automated driving level permitted to be registered.

Furthermore, a registration request processing unit that requests an external network device capable of communicating with the mobile device to register the automated driving level may be further included, in which the arithmetic model request unit may request the arithmetic model from the external network device, and acquire the arithmetic model from the external network device.

Furthermore, a driving assistance processing unit that controls the movement control unit on the basis of a result of calculating detection data of a sensor provided in the mobile device by the arithmetic model may be further included, in which the arithmetic model may be determined by the external network device on the basis of at least one or more of detection content of the sensor, a type of the mobile device, or performance of the driving assistance processing unit.

Furthermore, an arithmetic model determination unit that confirms an expiration date or a valid area of a first arithmetic model owned may be further included, in which the arithmetic model request unit may request a second arithmetic model whose date or area is valid according to a confirmation result of the arithmetic model determination unit.

Furthermore, an arithmetic model storage unit that stores the arithmetic model may be further included, in which the first arithmetic model may be updated to the second arithmetic model in the arithmetic model storage unit.

An information processing method according to an embodiment of the present disclosure includes:
- by one or more mobile devices capable of setting an automated driving level, requesting an arithmetic model corresponding to the automated driving level from an external network device;
- by the external network device, determining the arithmetic model and providing the arithmetic model to the mobile device;
- by the mobile device, transmitting information regarding possession of the arithmetic model to the external network device;
- by the external network device, determining whether or not registration of the automated driving level is possible on the basis of the information, and giving a notification of registration permission to the mobile device; and
- by the mobile device, starting movement control based on an automated driving level permitted to be registered when the notification is received.

MODE FOR CARRYING OUT THE INVENTION

Hereinafter, embodiments of the present disclosure will be described with reference to the drawings. Hereinafter, main components of the present disclosure will be mainly described, but the present disclosure may include components and functions that are not illustrated or described. The following description does not exclude components and functions that are not illustrated or described.

Figure 1:
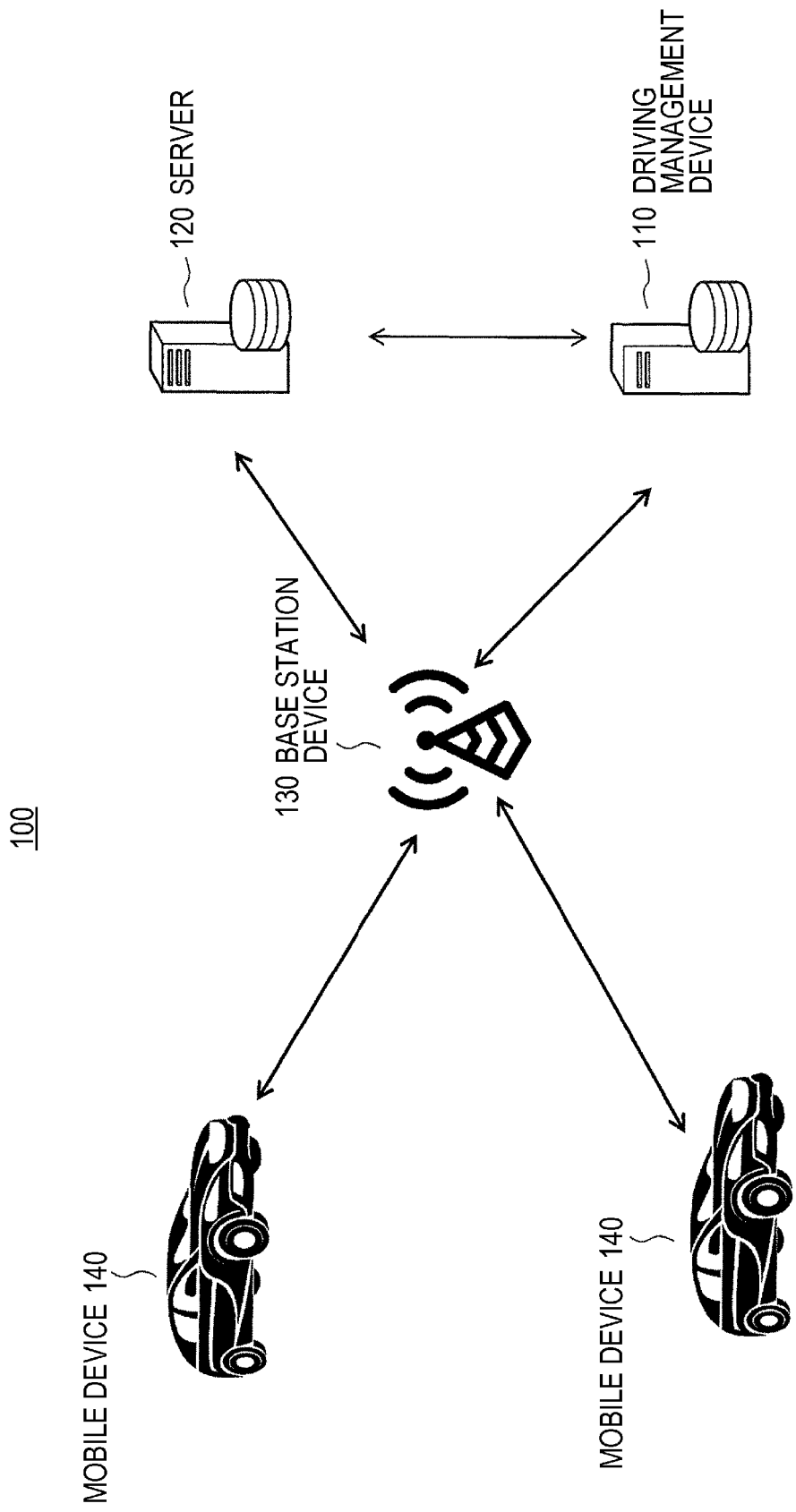
FIG. 1 is a diagram illustrating an example of a configuration of a driving assistance system according to an embodiment.

FIG. 1 is a diagram illustrating an example of a configuration of a driving assistance system according to an embodiment. The driving assistance system 100 according to the present embodiment includes a driving management device 110, a server 120, a base station device 130, and a mobile device 140. Although two mobile devices 140 are illustrated in FIG. 1, the number of mobile devices 140 may be one or three or more. That is, the driving assistance system 100 includes one or more mobile devices 140. The driving assistance system 100 is an example of an information processing system. Furthermore, the driving management device 110, the server 120, and the base station device 130 constitute an external network device. Moreover, the driving management device 110, the server 120, and the base station device 130 are examples of a registration determination device, an arithmetic model determination device, and a communication device, respectively. Furthermore, although one base station device 130 is illustrated in FIG. 1, two or more base station devices 130 are arranged to provide a communication area at a national level. Here, the base station device 130 may include various types of devices such as a base station having different maximum transmission power and operating frequency bands, a remote radio head (RRH), and a transmission/reception point (TRP), such as a macro cell, a pico cell, a micro cell, a small cell, and a femto cell.

The driving management device 110 collects data from the mobile device 140 via the base station device 130, and performs management related to movement, that is, traveling of the mobile device 140. The management related to traveling widely includes control and management of the driving assistance processing unit 142 provided in the mobile device 140.

The server 120 executes various arithmetic processing on which an instruction is given from the driving management device 110. For example, the server 120 performs machine learning or deep learning using data acquired by the driving management device 110 from the mobile device 140, and generates a neural network model as a result.

The server 120 may be included (integrated) in the driving management device 110. Furthermore, the data acquired from the mobile device 140 can include, for example, data acquired by a sensor 141 provided in the mobile device 140 or processed data, and further, control information and output information of a power system, a braking device, and a steering device provided in the mobile device 140.

The server 120 may generate and manage a neural network model for each automated driving level of each mobile device 140. Note that the definitions of automated driving levels formulated by the Society of Automotive Engineers (SAE) International are as follows.

Level 0: Driver operates everything
Level 1: System supports either steering operation or acceleration/deceleration
Level 2: System supports both steering operation and acceleration/deceleration
Level 3: System operates everything at specific location, and driver operates in emergency.
Level 4: System operates all at specific location
Level 5: System operates all without location limitation Specific locations specified at the level 4 are assumed to be, for example, expressways for private cars and trucks in logistics services, or areas with relatively low traffic volume and good visibility such as underpopulated areas in movement services, areas with relatively simple driving environments such as university campuses and airport facilities, or the like. In the following description, the automated driving level refers to, for example, any of the five levels. In addition, the automated driving levels may be classified more finely than these five levels.

Figure 2:
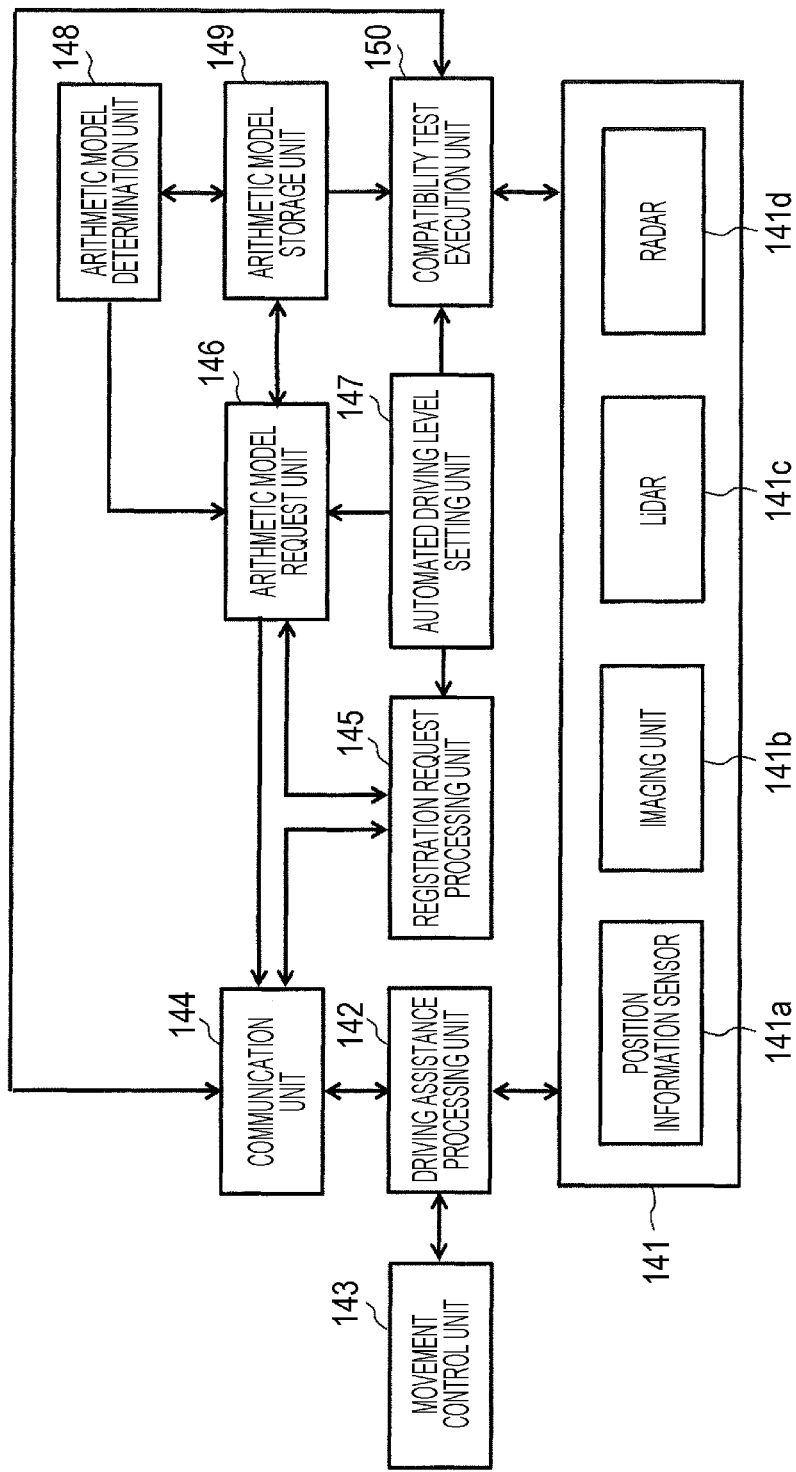
FIG. 2 is a block diagram illustrating a configuration example of a mobile device.

FIG. 2 is a block diagram illustrating a configuration example of the mobile device 140. The mobile device 140 includes a sensor 141, a driving assistance processing unit 142, a movement control unit 143, a communication unit 144, a registration request processing unit 145, an arithmetic model request unit 146, an automated driving level setting unit 147, an arithmetic model determination unit 148, an arithmetic model storage unit 149, and a compatibility test execution unit 150. Each unit except for the sensor 141 constitutes an information processing device.

The sensor 141 includes, for example, a position information sensor 141a, a camera module (including an image sensor) 141b, a light detection and ranging or laser imaging detection and ranging (LiDAR) 141c, and a radar 141d. Note that the sensor 141 may include at least one of these sensors. Furthermore, the sensor 141 may include an inertial measurement unit (IMU) that is a unit in which an acceleration sensor, a rotational angular acceleration sensor/gyro sensor, a magnetic field sensor, an atmospheric pressure sensor, a temperature sensor, and the like are integrated.

The position information sensor 141a can widely include not only a global navigation satellite system (GNSS) represented by a global positioning system (GPS) but also a positioning technology using a signal transmitted and received via the communication unit 144 corresponding to an odometer, long term evolution (LTE), or a 4G or 5G cellular system. The positioning technology in cooperation with the 4G or 5G cellular system may broadly include that the position information sensor 141a obtains information for assisting positioning from a location management function (LMF) through an LTE positioning protocol (LPP), or provides data detected by the position information sensor 141a to the LMF through the LPP, and the LMF calculates a position. Moreover, the position information sensor 141a includes a positioning technology using highly accurate three-dimensional geospatial information called a dynamic map held in advance by the driving assistance processing unit 142 or dynamically acquired and updated via the communication unit 144. The camera module 141b is equipped with a plurality of image sensors, and acquires image information of the outside of the vehicle and image information of the inside of the vehicle including movement and expression of the driver.

The driving assistance processing unit 142 controls the movement control unit 143 on the basis of a calculation result obtained by inputting detection data of the sensor 141 to a neural network model generated by AI, for example, machine learning or deep learning, and performs processing of achieving autonomous driving (ADAS/AD).

The neural network model may be implemented in the driving assistance processing unit 142 in advance, or may be acquired from the driving management device 110 or the server 120 via the base station device 130, and updated and stored as appropriate. In addition, the neural network model may be one neural network model or may include a plurality of neural network models. The plurality of neural network models may be a neural network model prepared for each sensor 141 as what is called edge AI, or may be a neural network model prepared for each control of the movement control unit 143.

For example, the movement control unit 143 supplies control information of acceleration, deceleration, or the like to the power system, supplies control information of deceleration, stop, or the like to the braking device, and supplies control information such as xx [cm] left and yy [cm] right to the steering device.

The communication unit 144 performs wireless communication with the server 120 and the driving management device 110 via the base station device 130. Furthermore, the communication unit 144 inputs and outputs data and the like to and from the driving assistance processing unit 142, the registration request processing unit 145, the arithmetic model request unit 146, and the compatibility test execution unit 150. Here, the base station device 130 may include a roadside machine that is a transportation infrastructure or a road side unit (RSU).

Moreover, the communication unit 144 performs V2X communication such as vehicle-to-vehicle communication, road-to-vehicle (vehicle-to-infrastructure) communication, communication between a vehicle and a home (vehicle-to-home), communication between a vehicle and the base station device 130 (vehicle-to-network), and vehicle-to-pedestrian communication. The V2X communication can be achieved by providing a V2X module in the communication unit 144.

The registration request processing unit 145 performs processing related to a registration request of the automated driving level of the mobile device 140 with the driving management device 110. The arithmetic model request unit 146 performs processing related to a provision request of an arithmetic model corresponding to the automated driving level requested to be registered with the server 120. The automated driving level setting unit 147 performs processing related to setting of the automated driving level of the mobile device 140. The arithmetic model determination unit 148 performs processing related to determination of validity of the arithmetic model. The arithmetic model storage unit 149 stores the arithmetic model. The compatibility test execution unit 150 performs processing related to execution of a compatibility test set in advance according to the automated driving level or given in instruction from the driving management device 110. Note that the processing content of each unit will be described in detail later.

Figure 3:
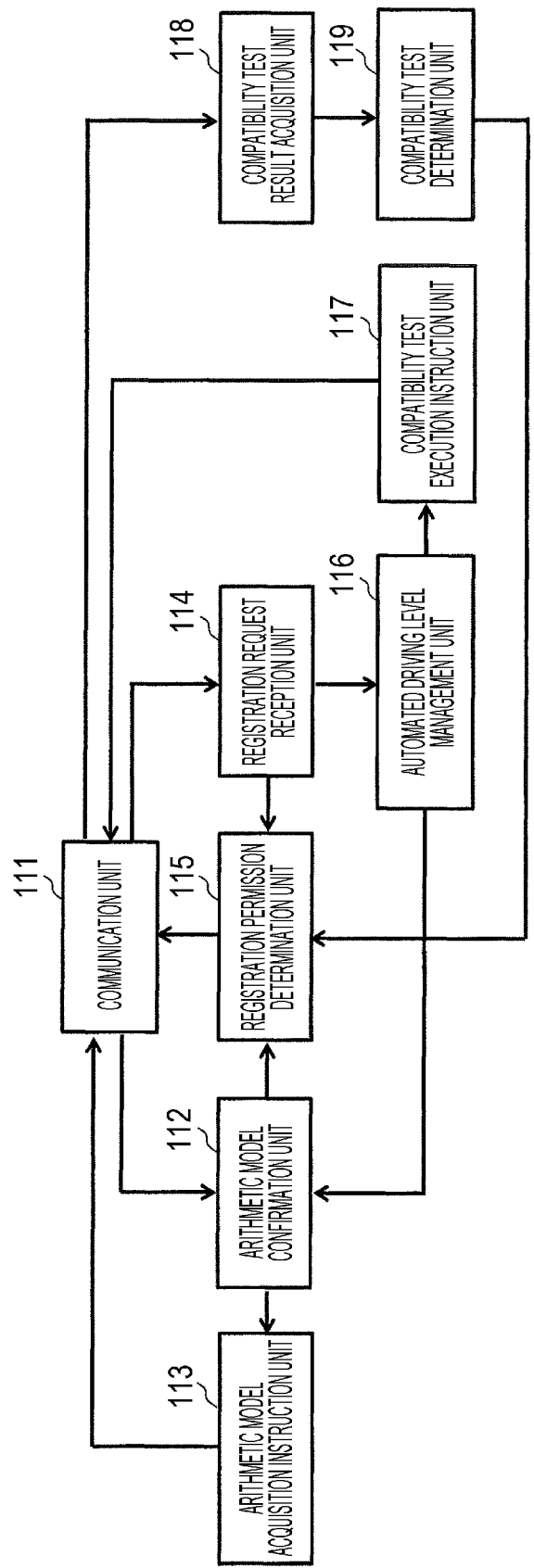
FIG. 3 is a block diagram illustrating a configuration example of a driving management device.

FIG. 3 is a block diagram illustrating a configuration example of the driving management device 110. The driving management device 110 includes a communication unit 111, an arithmetic model confirmation unit 112, an arithmetic model acquisition instruction unit 113, a registration request reception unit 114, a registration permission determination unit 115, an automated driving level management unit 116, a compatibility test execution instruction unit 117, a compatibility test result acquisition unit 118, and a compatibility test determination unit 119.

The communication unit 111 outputs data or the like received from the server 120 or data or the like received from the mobile device 140 via the base station device 130 to each unit of the driving management device 110 according to data contents. Furthermore, the communication unit 111 transmits data and the like input from each unit of the driving management device 110 to the mobile device 140 or the server 120.

The arithmetic model confirmation unit 112 performs confirmation processing of the arithmetic model corresponding to the automated driving level requested to be registered from the mobile device 140. The arithmetic model acquisition instruction unit 113 performs processing related to the instruction to acquire the arithmetic model confirmed by the arithmetic model confirmation unit 112 on the mobile device 140. The registration request reception unit 114 performs processing related to reception of a registration request of the automated driving level from the mobile device 140. The registration permission determination unit 115 performs determination processing regarding whether or not registration of the automated driving level of the mobile device 140 is possible. The automated driving level management unit 116 manages the automated driving level of each mobile device 140. The compatibility test execution instruction unit 117 performs processing related to an instruction to execute the compatibility test according to the automated driving level of the mobile device 140. The compatibility test result acquisition unit 118 performs processing related to acquisition of a test result from the mobile device 140 that has executed the compatibility test. The compatibility test determination unit 119 performs determination processing regarding pass or fail of the compatibility test on the basis of the test result acquired by the compatibility test result acquisition unit 118. Note that the processing content of each unit will be described in detail later.

Figure 4:
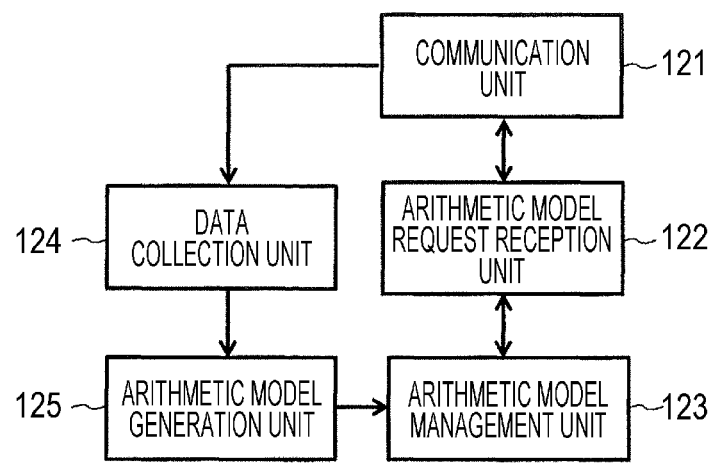
FIG. 4 is a block diagram illustrating a configuration example of a server.

FIG. 4 is a block diagram illustrating a configuration example of the server 120. The server 120 includes a communication unit 121, an arithmetic model request reception unit 122, an arithmetic model management unit 123, a data collection unit 124, and an arithmetic model generation unit 125.

The communication unit 121 outputs data or the like received from the driving management device 110 or data or the like received from the mobile device 140 via the base station device 130 to the arithmetic model request reception unit 122 or the data collecting unit 124 according to data contents. Furthermore, the communication unit 121 transmits data and the like input from the arithmetic model request reception unit 122 to the mobile device 140 or the driving management device 110.

The arithmetic model request reception unit 122 performs reception processing related to the provision request of the arithmetic model from the mobile device 140. The arithmetic model management unit 123 performs processing related to management of the arithmetic model provided to each mobile device 140. The data collection unit 124 performs processing related to collection of data detected by the mobile device 140. The arithmetic model generation unit 125 performs processing related to generation of the arithmetic model using data collected by the data collection unit 124. Note that the processing content of each unit will be described in detail later.

Figure 5:
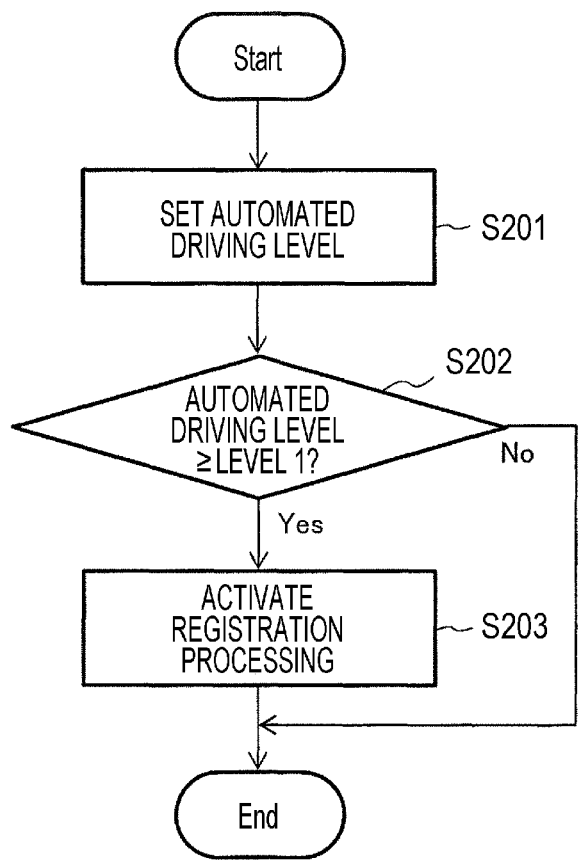
FIG. 5 is a flowchart illustrating an example of setting processing of an automated driving level.

FIG. 5 is a flowchart illustrating an example of automated driving level setting processing. Hereinafter, the automated driving level setting processing by the mobile device 140 will be described.

First, the automated driving level setting unit 147 of the mobile device 140 sets an automated driving level prior to driving and notifies the registration request processing unit 145 of the automated driving level (step S201). In step S201, for example, the automated driving level setting unit 147 may set the automated driving level related to the latest operation, or may dynamically change and update the automated driving level.

Subsequently, the registration request processing unit 145 determines whether or not the automated driving level is equal to or higher than the level 1 (step S202). In a case where the automated driving level is equal to or higher than the level 1, the registration request processing unit 145 activates registration processing in the driving management device 110 (step S203). On the other hand, in a case where the automated driving level is less than the level 1 in step S202, the registration request processing unit 145 does not perform the registration processing, and ends the automated driving level setting processing.

Note that, in the example of FIG. 5, an example is illustrated in which the registration processing is activated when the automated driving level is equal to or higher than the level 1, but the present invention is not limited to this example. For example, the driving management device 110 may set the mobile device 140 to activate the registration processing when the automated driving level is equal to or higher than the level 3. Moreover, the driving management device 110 may vary the automated driving level at which the registration processing is activated in an area or in a time zone.

Figure 6:
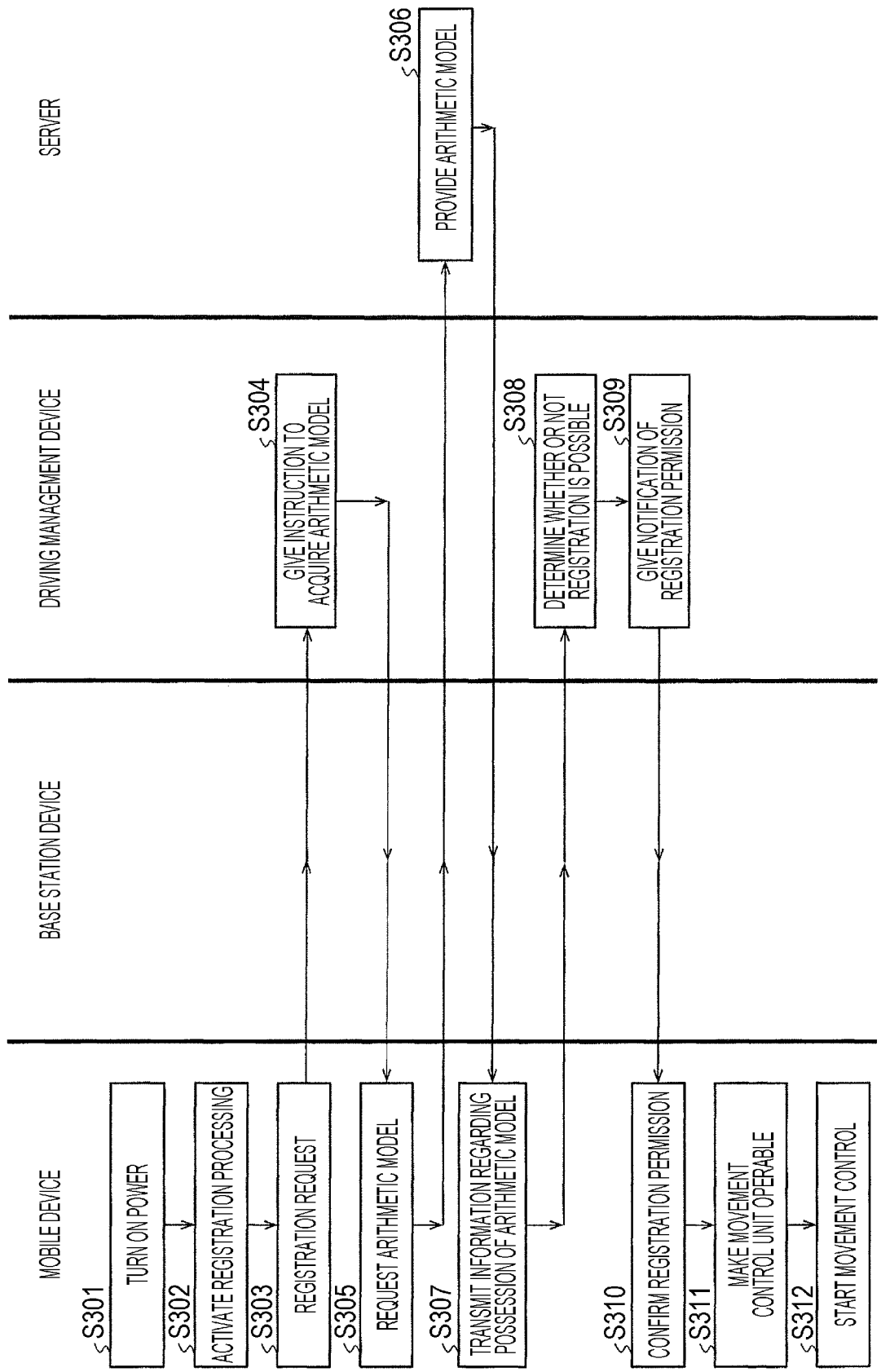
FIG. 6 is a sequence diagram illustrating an example of registration processing of the automated driving level.

FIG. 6 is a sequence diagram illustrating an example of the registration processing of the automated driving level. Hereinafter, a process of registering the automated driving level of the mobile device 140 in the driving management device 110 will be described.

When the power of the mobile device 140 is turned on (the engine is started) (step S301), the registration request processing unit 145 activates the registration processing (step S302).

Subsequently, the communication unit 144 transmits a registration request including the automated driving level to the driving management device 110 via the base station device 130 (step S303). In step S303, in addition to the automated driving level, the registration request may include, for example, position information of the mobile device 140, a vehicle type, performance (hardware configuration) of the driving assistance processing unit 142, or information regarding a hardware type, a model number, a year of manufacture, an operating system (OS) version, and a version of firmware of an electronic control unit (ECU) to be mounted. Moreover, the registration request may include information regarding capabilities such as applicability to a specific operation form, for example, formation traveling called platooning.

In the driving management device 110, when the registration request reception unit 114 receives the registration request through the communication unit 111, the automated driving level management unit 116 notifies the arithmetic model confirmation unit 112 of the automated driving level included in the registration request. The arithmetic model confirmation unit 112 confirms the arithmetic model corresponding to the automated driving level and notifies the arithmetic model acquisition instruction unit 113 of the arithmetic model. The arithmetic model acquisition instruction unit 113 instructs the mobile device 140 of the request source to acquire the arithmetic model corresponding to the automated driving level of the registration request target via the base station device 130 (step S304). In step S304, for example, the arithmetic model acquisition instruction unit 113 may give an instruction to use the arithmetic model held by the mobile device 140 in advance in a case where the automated driving level included in the registration request is equal to or lower than the level 2, and may give an instruction to acquire the arithmetic model in a case where the automated driving level is equal to or higher than the level 3. In addition, the arithmetic model on which an instruction is given by the arithmetic model acquisition instruction unit 113 may be selected according to a difference in the configuration of the sensor 141, the vehicle type of the mobile device 140, and performance of the driving assistance processing unit 142 in addition to a response to the requested automated driving level.

In the mobile device 140 that has received an instruction to acquire the arithmetic model, the arithmetic model request unit 146 transmits a request for the arithmetic model through the communication unit 111 (step S305). The request for the arithmetic model is transmitted to the server 120 via the base station device 130.

In the server 120, the arithmetic model request reception unit 122 receives the request for the arithmetic model through the communication unit 121. Subsequently, the arithmetic model management unit 123 provides the arithmetic model indicated in the request (step S306). The provided arithmetic model is transmitted from the communication unit 121 to the mobile device 140 as the request source via the base station device 130. The arithmetic model is, for example, a neural network model obtained by the machine learning or the deep learning, and a different neural network model is provided for each automated driving level. Moreover, an expiration date and a valid geographical or spatial area may be set in the arithmetic model.

This neural network model includes layers called an input layer including a plurality of nodes, a hidden layer (alternatively, an intermediate layer), and an output layer, and the respective nodes are connected via edges. Each layer has a function called an activation function, and each edge is weighted. The neural network model based on the deep learning includes a plurality of hidden layers.

The neural network model is, for example, a model in a form called convolution neural network (CNN), recurrent neural network (RNN), or long short-term memory (LSTM).

In the CNN, the hidden layer includes respective layers called a convolution layer and a pooling layer. In the convolution layer, filtering is performed by a convolution operation, and data called a feature map is extracted. In the pooling layer, information of the feature map output from the convolution layer is compressed, and down-sampling is performed. The CNN is used, for example, for image recognition. Information of each pixel, which is also called a pixel of an image, is input to the input layer, and information related to the image recognized as the output layer can be obtained. For example, information of each pixel of an image detected by the camera module 141b is input to the CNN.

The RNN has a network structure in which a value of the hidden layer is recursively input to the hidden layer, and for example, short-period time-series data is processed.

In the LSTM, the influence of a far past output can be held by introducing a parameter called a memory cell that holds the state of the intermediate layer into an intermediate layer output of the RNN. That is, the LSTM processes time-series data of a longer period than the RNN.

For example, time-series data of information related to the position detected by the position information sensor 141a, time-series data of information related to distance measurement detected by the LiDAR 141c and the radar 141d, time-series data of angular velocity and acceleration detected by the IMU, time-series data of control information from the movement control unit 143, time-series data of information related to the position and speed of a surrounding vehicle or information detected by sensors included in the surrounding vehicle, which are acquired through the V2X communication of the communication unit 144, or moreover, time-series data of information related to a recognition image obtained as an output of the CNN constituting the arithmetic model, or the like is input to the input layer of the RNN or the LSTM. Furthermore, for example, time-series data of the highly accurate three-dimensional geospatial information included in the dynamic map is input to the input layer of the RNN or the LSTM.

The arithmetic model includes one or more CNNs, RNNs, and/or LSTMs, and is processed dependently or in parallel. The output of the arithmetic model is used, for example, as control information of the movement control unit 143. As a calculation result by the arithmetic model, for example, detection processing, recognition processing, and the like of an object around the mobile device 140 are output. The detection processing of an object is, for example, processing of detecting presence or absence, size, shape, position, movement, and the like of an object. The recognition processing of an object is, for example, processing of recognizing an attribute such as an object type or identifying a specific object. However, the detection processing and the recognition processing are not always clearly separated and may overlap.

Furthermore, the arithmetic model detects an object around the vehicle 1 by performing clustering to classify a point cloud based on sensor data by the LiDAR 141c, the radar 141d, or the like for each cluster of the point cloud as an output result. Thus, the presence or absence, size, shape, and position of the object around the vehicle 1 are detected. In this case, the arithmetic model may be an arithmetic model provided as the edge AI as described above. The movement of the object around the vehicle 1 is detected by performing tracking to follow movement of the cluster of the point cloud classified by clustering. Thus, the speed and the traveling direction (movement vector) of the object around the mobile device 140 are detected.

Furthermore, the arithmetic model detects or recognizes a vehicle, a person, a bicycle, an obstacle, a structure, a road, a traffic light, a traffic sign, a road sign, and the like with respect to image data supplied from the camera module (including the image sensor) 141b. In addition, the type of the object around the mobile device 140 may be recognized by performing recognition processing such as semantic segmentation.

Furthermore, sensor fusion processing of combining a plurality of different types of sensor data (for example, data supplied from two or more of the camera module 141*b*, the LiDAR 141*c*, or the radar 141*d*) to obtain new information is performed. As a method of combining different types of sensor data, there are early fusion in which data of each sensor is integrated without preprocessing, rate fusion in which data is integrated after preprocessing, and other integration methods such as integration of only feature amounts, integration of only recognition results, and integration at different processing levels for each sensor.

Furthermore, the arithmetic model can perform recognition processing of traffic rules around the mobile device 140 on the basis of held map information, an estimation result of the self position by the position information sensor 141*a*, and a recognition result of objects around the mobile device 140, and output a result. With this processing, it is possible to recognize a position and a state of a signal, contents of a traffic sign and a road sign, contents of a traffic regulation, a lane on which the vehicle can travel, and the like.

Furthermore, for example, the arithmetic model can perform recognition processing of the environment around the vehicle 1. As the surrounding environment to be recognized by the recognition unit 73, weather, temperature, humidity, brightness, a state of a road surface, and the like are assumed.

Furthermore, for example, the arithmetic model creates an action plan of the mobile device 140. The action plan is created by performing processing of route planning and route following using the output by the arithmetic model as described above.

Note that the route planning (Global path planning) is a process of planning a rough route from a start to a goal. This route planning is called track planning, and also includes processing of track generation (Local path planning) that allows safe and smooth traveling near the mobile device 140 in consideration of motion characteristics of the vehicle 1 in a route planned by the route planning. The route planning may be distinguished from long-term route planning, and startup generation from short-term route planning, or local route planning. The safety-first route represents a concept similar to startup generation, short-term route planning, or local route planning.

The route following is a process of planning an operation for safely and accurately traveling on the route planned by the route planning within a planned time. For example, the arithmetic model can calculate a target velocity and a target angular velocity of the mobile device on the basis of a result of the processing of the route following.

Furthermore, in order to achieve the created action plan as an output of the arithmetic model, the operation of the mobile device 140 is controlled by the movement control unit 143.

For example, the movement control unit 143 performs a steering operation, acceleration/deceleration, and the like, and performs control such that the mobile device 140 travels on the track calculated by the track plan. For example, the movement control unit 143 performs coordinated control for the purpose of achieving ADAS functions such as collision avoidance or impact mitigation, following traveling, vehicle speed maintained traveling, collision warning of own vehicle, and lane deviation warning of the own vehicle. For example, the movement control unit 143 performs cooperative control for the purpose of automated driving or the like in which the vehicle autonomously travels without depending on an operation by the driver.

Moreover, recognition and detection processing of information inside the vehicle may be performed, and authentication processing of the driver, recognition processing of the state of the driver, and the like are performed on the basis of sensor data from an in-vehicle sensor, for example, a camera module (including an image sensor) 141*b* mounted inside the vehicle, input data input to a human machine interface (HM), and the like. In this case, as the state of the driver to be recognized, for example, physical condition, alertness, concentration, fatigue, line-of-sight direction, degree of drunkenness, driving operation, posture, and the like are assumed.

Note that, as a result of the recognition and detection processing of the inside of the vehicle, authentication processing of a passenger other than the driver and recognition processing of the state of the passenger may be performed. Furthermore, for example, recognition processing of the situation inside the vehicle may be performed on the basis of sensor data from an in-vehicle sensor. As the condition inside the vehicle to be recognized, for example, temperature, humidity, brightness, odor, and the like are assumed.

In the mobile device 140, the arithmetic model request unit 146 receives the arithmetic model through the communication unit 144 and stores the arithmetic model in the arithmetic model storage unit 149. Subsequently, the arithmetic model request unit 146 causes the communication unit 144 to transmit information regarding possession of the valid arithmetic model (step S307). This information is transmitted to the driving management device 110 via the base station device 130. Furthermore, the information regarding the possession of the valid arithmetic model includes, for example, information regarding the arithmetic model such as an identification (ID) for identifying the arithmetic model, an expiration date, and a valid area.

In the driving management device 110, the above-described information is input to the registration permission determination unit 115 via the communication unit 111 and the arithmetic model confirmation unit 112. The registration permission determination unit 115 determines whether or not registration is possible on the basis of the above-described information (step S308). In step S308, for example, the registration permission determination unit 115 permits the registration in a case where an identification (ID) for identifying the arithmetic model matches an authentic ID registered in advance, and rejects the registration in a case where the ID does not match the authentic ID registered in advance.

In a case where the information regarding the possession of the valid arithmetic model satisfies a registration requirement, the registration permission determination unit 115 gives a notification of registration permission to the mobile device 140 via the base station device 130 (step S309).

In the mobile device 140, the registration request processing unit 145 receives the notification of the registration permission through the communication unit 144 and confirms the registration permission (step S310). Thus, the movement control unit 143 becomes operable (step S311). Thereafter, the movement control unit 143 starts operation at the automated driving level corresponding to the arithmetic model (step S312).

Note that, in a case where the mobile device 140 possesses a valid arithmetic model in advance, a registration request including the information regarding the possession of the valid arithmetic model described above may be transmitted to the driving management device 110 in addition to the automated driving level in step S303. Upon receiving the information regarding the possession of the valid arithmetic model in addition to the automated driving level, the driving management device 110 omits the processing from step S304 to step S307 and executes the processing from step S308.

After starting the operation at the automated driving level, the mobile device 140 appropriately confirms the validity of the owned arithmetic model. Hereinafter, processing related to the validity confirmation of the arithmetic model will be described.

Figure 7:
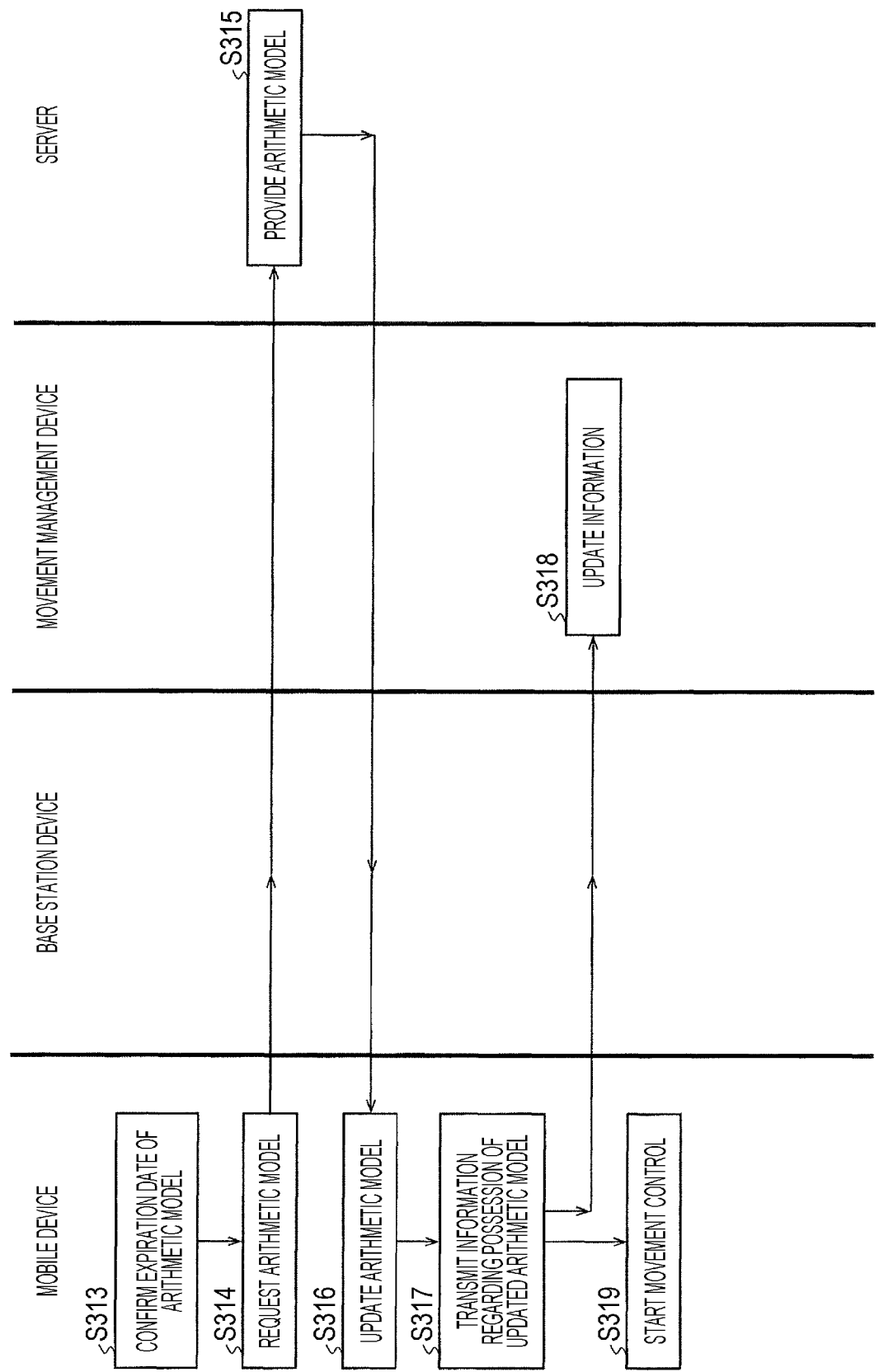
FIG. 7 is a sequence diagram illustrating an example of processing related to validity confirmation of an arithmetic model.

FIG. 7 is a sequence diagram illustrating an example of processing related to the validity confirmation of the arithmetic model. After the start of operation at the automated driving level, the arithmetic model determination unit 148 of the mobile device 140 confirms the expiration date of the possessed arithmetic model (step S313). As a result of the confirmation, when a remaining period falls within a certain period, the arithmetic model request unit 146 requests for the arithmetic model whose remaining period is valid from the communication unit 144 via the base station device 130 to the server 120 in order to update the arithmetic model (step S314).

In the server 120, the arithmetic model request reception unit 122 receives the request for the above-described arithmetic model through the communication unit 121. Subsequently, the arithmetic model management unit 123 provides the arithmetic model matching the request to the mobile device 140 via the base station device 130 (step S315).

In the mobile device 140, the arithmetic model request unit 146 receives the arithmetic model through the communication unit 144 and stores the arithmetic model in the arithmetic model storage unit 149. Thus, the arithmetic model stored in the arithmetic model storage unit 149 is updated to the valid arithmetic model whose remaining period is equal to or longer than the certain period (step S316).

Subsequently, the arithmetic model request unit 146 transmits information regarding the possession of the updated arithmetic model to the driving management device 110 via the base station device 130 from the communication unit 144 (step S317).

In the driving management device 110, the registration request reception unit 114 receives the above-described information through the communication unit 111, and the automated driving level management unit 116 updates the received information in association with the mobile device 140 as the transmission source (step S318).

Furthermore, in the mobile device 140, the arithmetic model request unit 146 transmits the information regarding the possession of the updated arithmetic model to the driving management device 110, and then the movement control unit 143 starts movement control on the basis of the updated arithmetic model (step S319).

Figure 8:
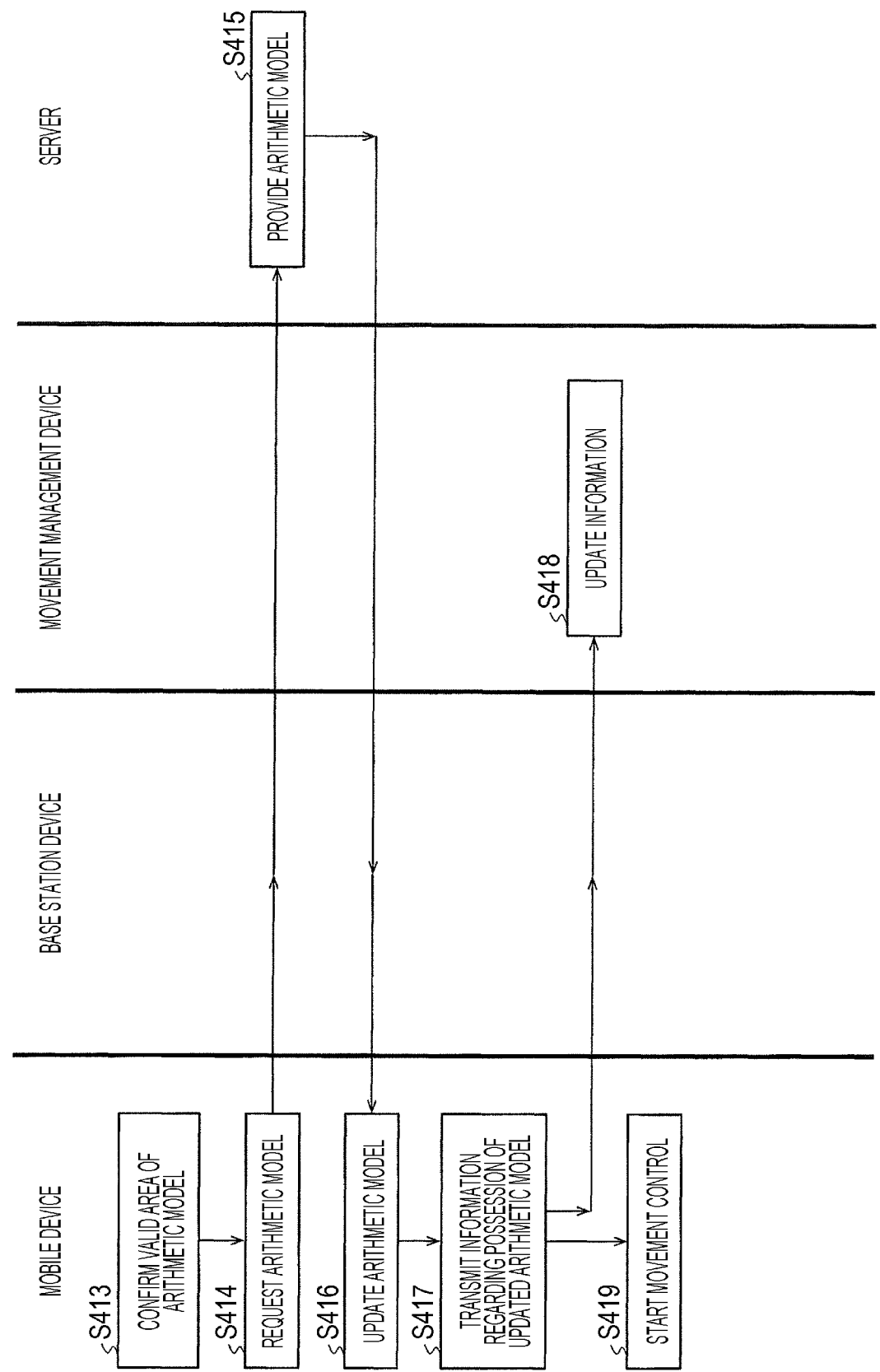
FIG. 8 is a sequence diagram of another example of the processing related to the validity confirmation of the arithmetic model.

FIG. 8 is a sequence diagram of another example of the processing related to the validity confirmation of the arithmetic model.

In this process, after the start of the operation at the automated driving level, the arithmetic model determination unit 148 of the mobile device 140 confirms whether or not the possessed arithmetic model is within a valid area (step S413). As a result of the confirmation, when the arithmetic model is out of the valid area, the arithmetic model request unit 146 requests the arithmetic model whose area is valid from the server 120 from the communication unit 144 via the base station device 130 (step S414).

In the server 120, the arithmetic model request reception unit 122 receives the request for the above-described arithmetic model through the communication unit 121. Subsequently, the arithmetic model management unit 123 provides the arithmetic model matching the request to the mobile device 140 via the base station device 130 (step S415).

In the mobile device 140, the arithmetic model request unit 146 receives the arithmetic model through the communication unit 144 and stores the arithmetic model in the arithmetic model storage unit 149. Thus, the arithmetic model stored in the arithmetic model storage unit 149 is updated to an arithmetic model whose area is valid (step S416).

Subsequently, the arithmetic model request unit 146 transmits the information regarding the possession of the updated arithmetic model to the driving management device 110 via the base station device 130 from the communication unit 144 (step S417).

In the driving management device 110, the registration request reception unit 114 receives the above-described information through the communication unit 111, and the automated driving level management unit 116 updates the received information in association with the mobile device 140 as the transmission source (step S418).

Furthermore, in the mobile device 140, the arithmetic model request unit 146 transmits the information regarding the possession of the updated arithmetic model to the driving management device 110, and then the movement control unit 143 starts the movement control on the basis of the updated arithmetic model (step S419).

Figure 9:
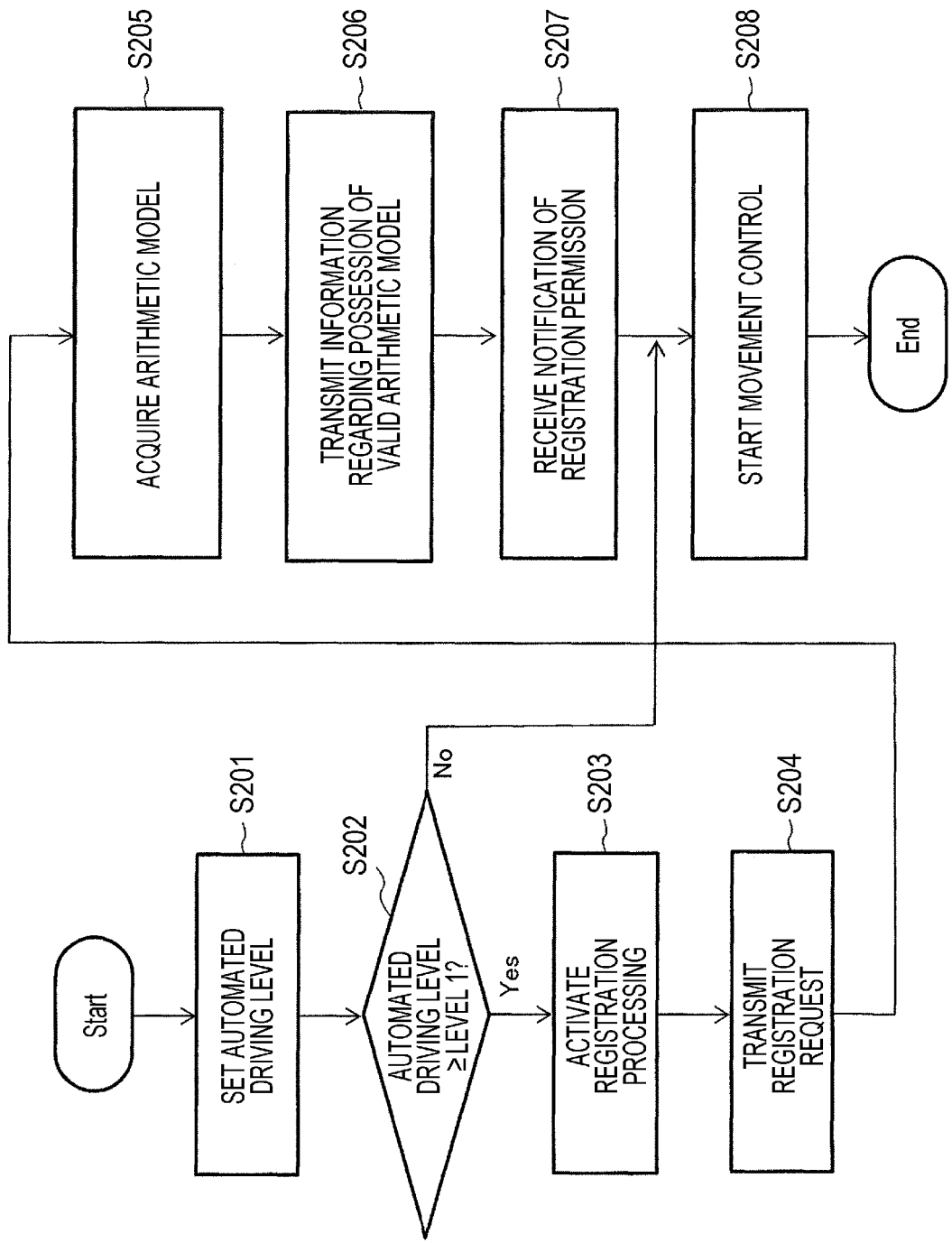
FIG. 9 is a flowchart illustrating a series of processing of the mobile device related to setting of the automated driving level.

FIG. 9 is a flowchart illustrating a series of processes of the mobile device 140 related to the setting of the automated driving level. Since the operation content from step S201 to step S203 is the same as that in FIG. 5, the description thereof will be omitted.

When the registration request processing unit 145 activates the registration processing of the automated driving level in the driving management device 110 (step S203), the communication unit 144 transmits the registration request of the automated driving level to the driving management device 110 (step S204).

Thereafter, the arithmetic model request unit 146 acquires the arithmetic model corresponding to the automated driving level from the server 120 on the basis of the instruction of the driving management device 110 (step S205). Subsequently, the arithmetic model request unit 146 transmits the information regarding the possession of the valid arithmetic model to the driving management device 110 (step S206).

Thereafter, when the registration request processing unit 145 receives a notification of registration permission from the driving management device 110 (step S207), the movement control unit 143 starts the movement control (step S208). Note that, in step S202, the movement control unit 143 also starts the movement control in a case where the automated driving level is not equal to or higher than 1, that is, the automated driving level is the level 0.

Note that, in the example of FIG. 9, an example is illustrated in which the registration processing is activated when the automated driving level is equal to or higher than the level 1, but the present invention is not limited to this example. For example, the driving management device 110 may set the mobile device 140 to activate the registration processing when the automated driving level is equal to or higher than the level 3. That is, in step S202, in a case where the automated driving level is the level 0, the level 1, or the level 2, the movement control unit 143 starts the movement control.

Figure 10:
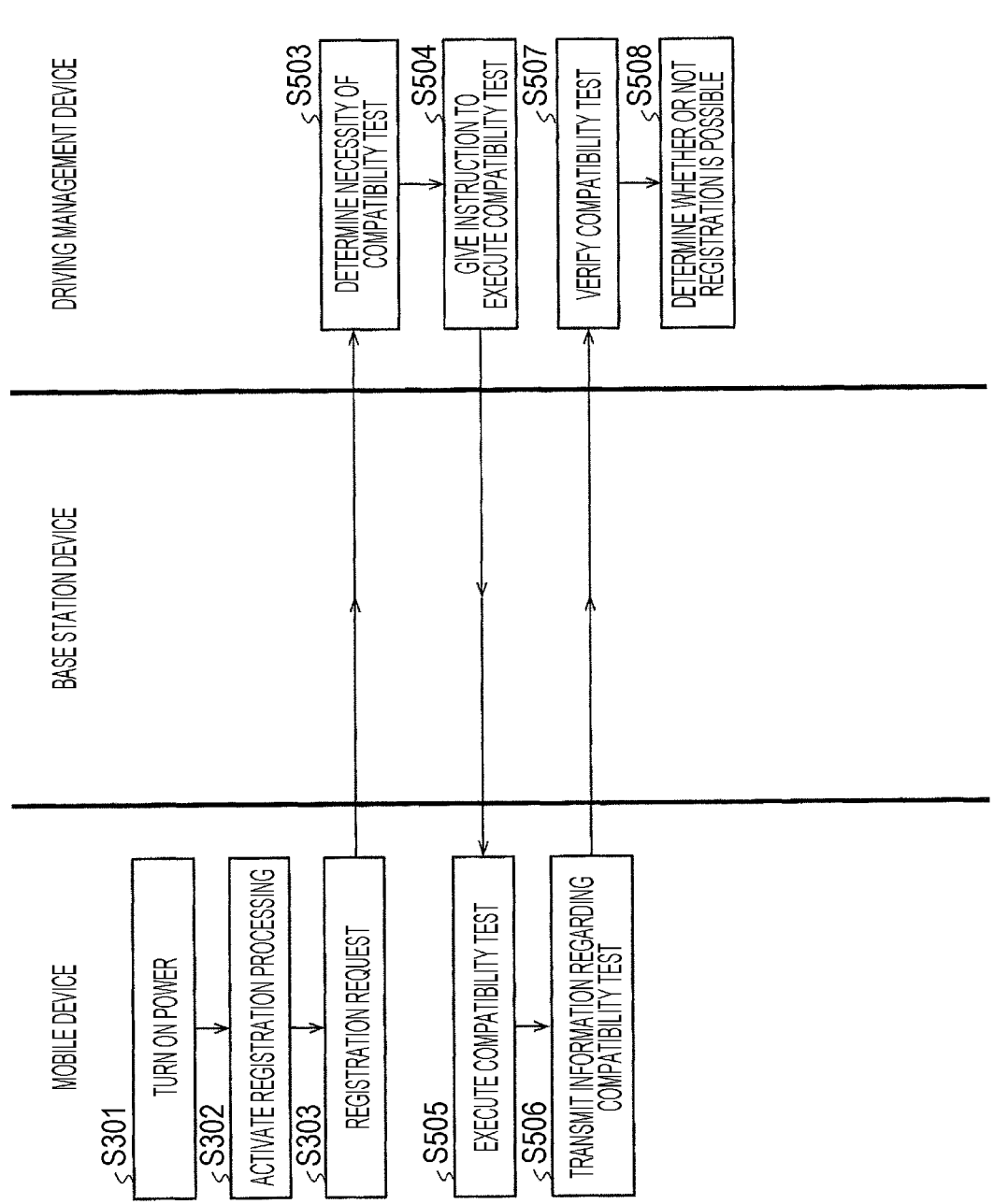
FIG. 10 is a flowchart illustrating another example of the registration processing of the automated driving level.

FIG. 10 is a flowchart illustrating another example of the registration processing of the automated driving level. Since the operation content from step S301 to step S303 illustrated in FIG. 10 is similar to that in FIG. 6, the description thereof will be omitted.

When the communication unit 144 of the mobile device 140 transmits the registration request including the automated driving level to the driving management device 110 via the base station device 130 (step S303), in the driving management device 110, the registration request reception unit 114 receives the registration request through the communication unit 111. Subsequently, the automated driving level management unit 116 notifies the compatibility test execution instruction unit 117 of the automated driving level indicated in the registration request.

The compatibility test execution instruction unit 117 determines the necessity of the compatibility test according to the automated driving level (step S503). For example, the compatibility test execution instruction unit 117 determines that it is necessary to execute the compatibility test for the mobile device 140 that requests registration of the automated driving level of 3 or higher. The compatibility test is performed to verify whether or not the driving assistance processing unit 142, the sensor 141, and the movement control unit 143 that assist the automated driving have performance necessary for achieving the automated driving level requested to be registered, or to detect a failure or a malfunction of the driving assistance processing unit 142, the sensor 141, and the movement control unit 143.

When determining that the compatibility test needs to be executed, the compatibility test execution instruction unit 117 instructs the mobile device 140 to execute the compatibility test corresponding to the automated driving level requested to be registered via the base station device 130 (step S504).

In the mobile device 140, an instruction to execute the compatibility test is received by the driving assistance processing unit 142 through the communication unit 144. As the compatibility test, the driving assistance processing unit 142 inputs data acquired by the sensor 141 to the neural network model generated by the AI, for example, the machine learning or the deep learning, and calculates an output thereof (step S505). This neural network model may be implemented in the driving assistance processing unit 142 in advance, or may be acquired from the driving management device 110 via the base station device 130 by the communication unit 144.

When the compatibility test is completed, the driving assistance processing unit 142 transmits information regarding the executed compatibility test from the communication unit 144 to the driving management device 110 via the base station device 130 (step S506). This information includes, for example, data acquired by the sensor 141 and an output calculated using the neural network model. The data acquired by the sensor 141 is transmitted in association with identification IDs of the position information sensor 141a, the camera module (including the image sensor) 141b, the LiDAR 141c, and the radar 141d.

In the driving management device 110, the compatibility test result acquisition unit 118 receives information regarding the compatibility test executed by the mobile device 140. Subsequently, the compatibility test determination unit 119 verifies the compatibility test (step S507). In the verification of the compatibility test, for example, detection accuracy of each sensor corresponding to the automated driving level for which registration has been requested is evaluated from the data acquired by the sensor 141. That is, the detection accuracy of the sensor 141 obtained for each automated driving level can be different. Furthermore, in the verification of the compatibility test, accuracy of the driving assistance processing unit 142 corresponding to the automated driving level requested to be registered is evaluated by comparing the output obtained by the driving management device 110 inputting the data acquired by the sensor 141 to the neural network model generated by the machine learning or the deep learning and an output acquired from the mobile device 140.

In addition, the compatibility test determination unit 119 may verify the compatibility test depending on whether or not a specific object on the dynamic map is detected with sufficient accuracy. The camera module 141b of the sensor 141 detects image information. The position information sensor 141a detects information regarding the position. The LiDAR 141c and the radar 141d detect information regarding distance measurement of an arbitrary object on the dynamic map. The driving assistance processing unit 142 calculates information regarding a correspondence relationship with an arbitrary object and a vector on the dynamic map on the basis of the image information, the information regarding the position, and the information regarding the distance measurement of the arbitrary object on the dynamic map. The driving assistance processing unit 142 reports the information regarding the position and the information regarding the vector of the specific object on the dynamic map on which an instruction is given from the driving management device 110 to the compatibility test determination unit 119. The compatibility test determination unit 119 verifies whether or not the reported information regarding the vector of the specific object is sufficiently accurate.

The compatibility test determination unit 119 notifies the registration permission determination unit 115 of the verification result of the compatibility test. The registration permission determination unit 115 determines whether or not the registration is possible on the basis of the verification result of the compatibility test (step S508). For example, in a case where the compatibility test determination unit 119 determines that the sensor 141 and the driving assistance processing unit 142 have not secured detection accuracy corresponding to the automated driving level requested to be registered, the registration permission determination unit 115 rejects the registration request from the mobile device 140. On the other hand, in a case where the compatibility test determination unit 119 determines that the sensor 141 and the driving assistance processing unit 142 have secured the detection accuracy corresponding to the automated driving level requested to be registered, the registration permission determination unit 115 permits the registration request from the mobile device 140.

In addition, in a case where it is determined that the sensor 141 and the driving assistance processing unit 142 have not secured the detection accuracy corresponding to the automated driving level requested to be registered, the registration permission determination unit 115 may determine whether the detection accuracy corresponding to the automated driving level one level lower has been secured. For example, when the automated driving level for which the registration is requested first is the level 3, the automated driving level one level lower is the level 2. In this case, in a case where it is determined that the sensor 141 and the driving assistance processing unit 142 have secured the detection accuracy corresponding to the automated driving level one level lower, the registration permission determination unit 115 may instruct the mobile device 140 to reset the automated driving level to the automated driving level one level lower via the base station device 130.

Figure 11:
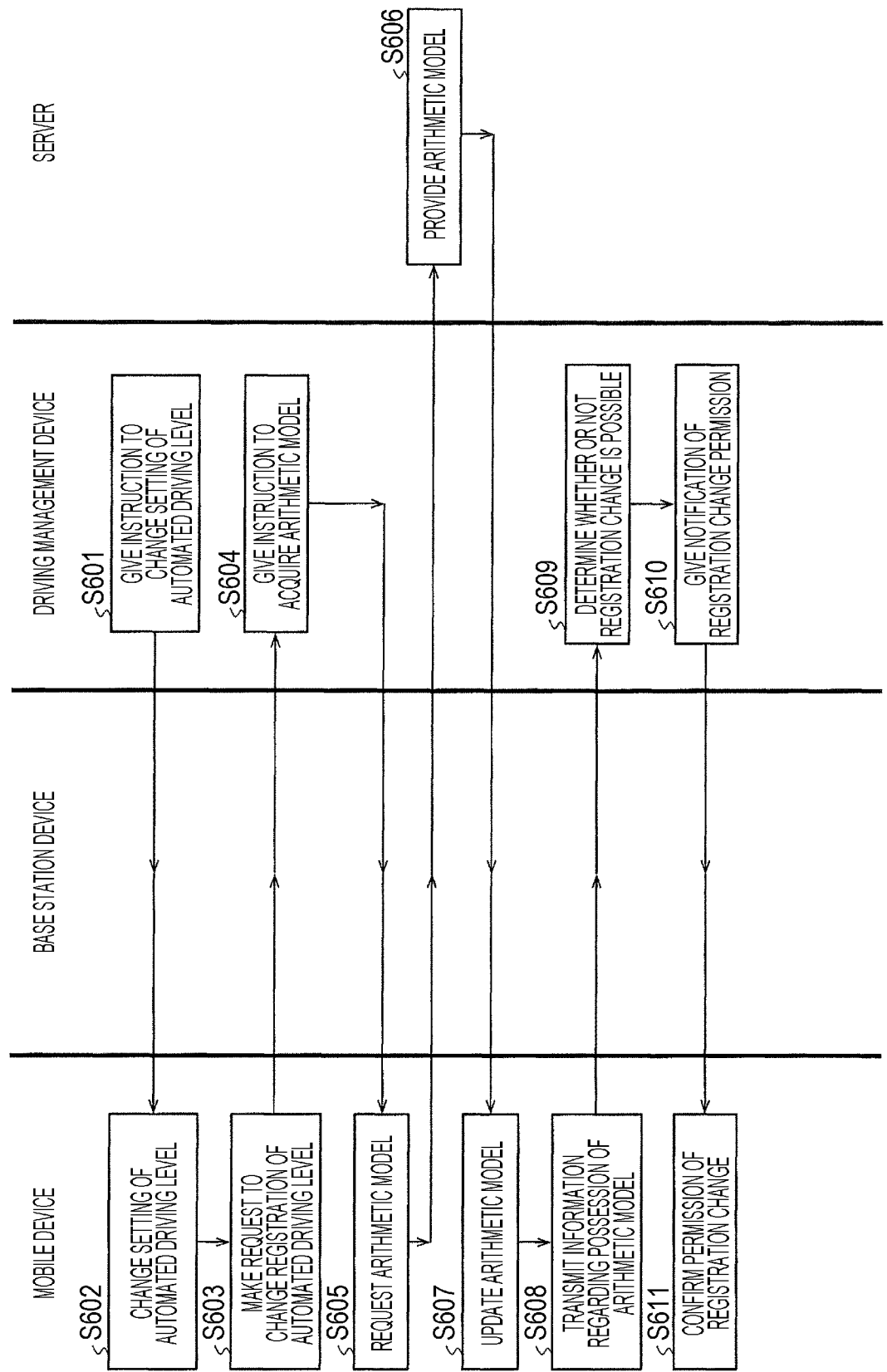
FIG. 11 is a flowchart illustrating an example of operation management processing of the driving management device.

FIG. 11 is a flowchart illustrating an example of the operation management processing of the driving management device 110. Hereinafter, operation management processing of the driving management device 110 will be described.

The registration permission determination unit 115 of the driving management device 110 instructs the mobile device 140 that has escaped or is about to escape from the specific region to change the setting of the automated driving level via the base station device 130 (step S601). The setting change of the automated driving level is, for example, a setting change to an automated driving level different from the currently registered automated driving level. For example, in a case where the mobile device 140 corresponding to the level 3 is about to escape from a specific region where the level 3 is permitted, the registration permission determination unit 115 gives an instruction to change the setting to any automated driving level from the level 0 to the level 2. Furthermore, in a case where the mobile device 140 corresponding to the level 4 is about to exit from a specific region where the level 4 is permitted, the registration permission determination unit 115 gives an instruction to change the setting to any automated driving level from the level 0 to the level 3. That is, the registration permission determination unit 115 gives an instruction on the setting change of the automated driving level on the basis of the position of the mobile device 140.

On the other hand, for example, in a case where the mobile device 140 corresponding to the level 3 is about to enter the specific region where the level 3 is permitted from a region other than the specific region where the level 3 is permitted, the registration permission determination unit 115 gives an instruction to change the setting from the automated driving level of the level 2 or less to the level 3. Furthermore, in a case where the mobile device 140 corresponding to the level 4 is about to enter the specific region where the level 4 is permitted from a region other than the specific region where the level 4 is permitted, the registration permission determination unit 115 gives an instruction to change the setting from the automated driving level of the level 3 or less to the level 4.

Note that, for example, even in the specific region where the level 3 is permitted, the mobile device 140 corresponding to the level 3 does not need to drive at the level 3, and merely has performance capable of driving at the level 3. Therefore, depending on the situation of the surrounding environment and the accuracy of the driving assistance processing unit 142, the registration permission determination unit 115 can instruct the mobile device 140 corresponding to the level 3 to travel at a lower automated driving level. That is, the registration permission determination unit 115 instructs the mobile device 140 corresponding to the level 3 to change the setting to one of the automated driving levels from the level 0 to the level 2. This instruction to dynamically change the setting of the automated driving level is important in optimizing the entire automated driving system.

Upon receiving the instruction to change the setting of the automated driving level through the communication unit 144 and the registration request processing unit 145, the automated driving level setting unit 147 of the mobile device 140 changes the setting to the automated driving level on which the instruction is given (step S602). Subsequently, the registration request processing unit 145 requests the driving management device 110 to change the registration of the automated driving level from the communication unit 144 via the base station device 130 (step S603).

In the driving management device 110, when the registration request reception unit 114 receives the above-described request, the automated driving level management unit 116 notifies the arithmetic model confirmation unit 112 of the automated driving level included in the registration request. The arithmetic model confirmation unit 112 confirms the arithmetic model corresponding to the automated driving level and notifies the arithmetic model acquisition instruction unit 113 of the arithmetic model. The arithmetic model acquisition instruction unit 113 instructs the mobile device 140 that has transmitted the registration request to acquire the arithmetic model corresponding to the automated driving level included in the registration request via the base station device 130 (step S604).

In the mobile device 140, the arithmetic model request unit 146 transmits the request for the arithmetic model through the communication unit 111 (step S605). The request for the arithmetic model is transmitted to the server 120 via the base station device 130.

In the server 120, the arithmetic model request reception unit 122 receives the request for the arithmetic model through the communication unit 121. Subsequently, the arithmetic model management unit 123 provides the arithmetic model indicated in the request (step S606). The provided arithmetic model is transmitted from the communication unit 121 to the mobile device 140 as the request source via the base station device 130.

In the mobile device 140, the arithmetic model request unit 146 receives the arithmetic model through the communication unit 144 and stores the arithmetic model in the arithmetic model storage unit 149. Thus, the arithmetic model is updated (step S607). Subsequently, the arithmetic model request unit 146 causes the communication unit 144 to transmit the information regarding the possession of the updated arithmetic model (step S608).

In the driving management device 110, the above-described information is input to the registration permission determination unit 115 via the communication unit 111 and the arithmetic model confirmation unit 112. The registration permission determination unit 115 determines whether or not the registration change is possible on the basis of the above-described information (step S609). In step S609, for example, the registration permission determination unit 115 permits the registration change in a case where the ID for identifying the changed arithmetic model coincides with the authentic ID registered in advance, and rejects the registration change in a case where the ID does not coincide with the authentic ID registered in advance.

In a case where the information regarding the possession of the changed arithmetic model satisfies the registration change requirement, the registration permission determination unit 115 gives a notification of the registration change permission to the mobile device 140 via the base station device 130 (step S610).

In the mobile device 140, the registration request processing unit 145 receives the permission notification of the registration change through the communication unit 144 and confirms the permission of the registration change (step S611).

Note that, in the operation management processing described above, the driving management device 110 gives an instruction to change the setting of the automated driving level in a case where the mobile device 140 exits from a certain specific region or enters a certain specific region, but the instruction timing is not limited to this case. For example, the sensitivity of the sensor may vary in weather changes and specific time zones. Accordingly, the driving management device 110 may give an instruction to change the setting of the automated driving level using a change in weather and time as triggers.

In addition, the automated driving level setting unit 147 of the mobile device 140 may request the setting change of the automated driving level by itself without receiving the instruction of the setting change of the automated driving level from the driving management device 110. For example, in addition to the weather change and the time zone described above, in a case where the remaining amount of fuel or the battery decreases, a request to lower the automated driving level (for example, change from the level 3 to the level 2) may be made due to lowering of sensitivity of a specific sensor, disabling of a specific function, or the communication unit 144 being out of the communication area of the base station device 130.

In addition, in a case where the instruction to change the setting to a lower automated driving level is received from the driving management device 110 in step S602, the automated driving level setting unit 147 may request the driving management device 110 to change the registration of the automated driving level including the information regarding the possession of the current arithmetic model in S603. For example, when the driving management device 110 determines that the current arithmetic model is valid even at the lower automated driving level, the processing from S604 to S608 can be omitted, and the processing from S609 can be executed.

Figure 12:
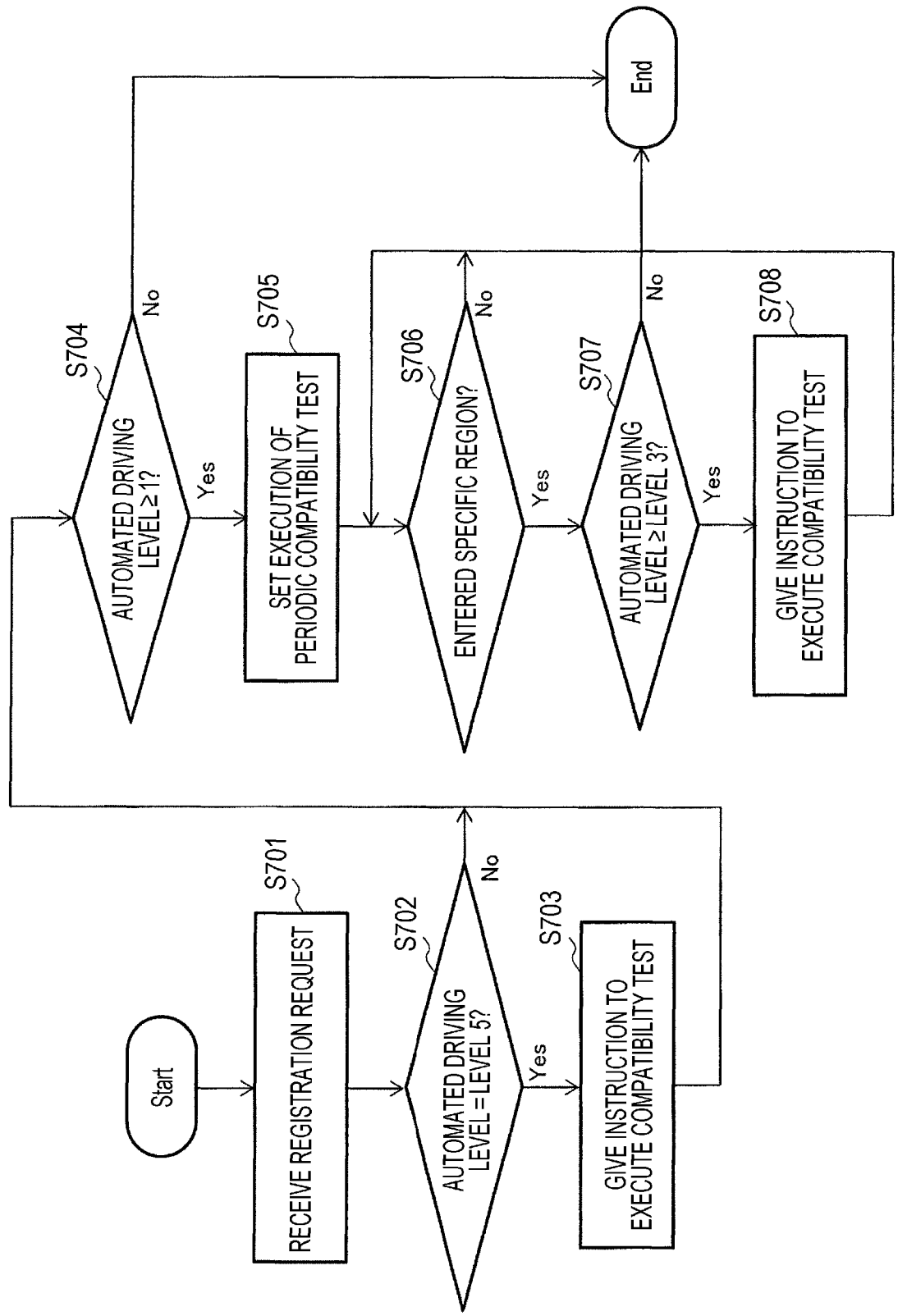
FIG. 12 is a flowchart illustrating an example of a part of the operation management processing.

FIG. 12 is a flowchart illustrating an example of a part of the operation management processing. Here, a processing flow regarding the necessity of execution of the compatibility test will be described.

When the registration request reception unit 114 receives the registration request including the updated automated driving level from the mobile device 140 (step S701), the automated driving level management unit 116 determines whether or not the automated driving level included in the registration request is the level 5 (step S702).

In a case where the automated driving level is the level 5, the compatibility test execution instruction unit 117 gives an instruction on execution of the compatibility test at the time of registration (step S703). Subsequently, the automated driving level management unit 116 determines whether or not the automated driving level set in the registered mobile device 140 is equal to or higher than the level 1 (step S704). Note that, also in a case where it is determined in step S702 that the automated driving level is not the level 5, the processing of step S704 is subsequently executed.

In a case where the automated driving level is not equal to or higher than the level 1, that is, in a case where the automated driving level is the level 0, the process ends. On the other hand, in a case where the automated driving level is 1 or higher, the compatibility test execution instruction unit 117 sets the mobile device 140 to execute the compatibility test that is periodic (step S705). For example, the execution of the compatibility test that is periodic is set to detect a failure or a malfunction of the driving assistance processing unit 142, the sensor 141, and the movement control unit 143 that assist the automated driving. Therefore, the period thereof is set on the basis of statistical information of histories of failures and malfunctions of the driving assistance processing unit 142, the sensor 141, and the movement control unit 143.

Furthermore, in a case where the driving assistance processing unit 142, the sensor 141, and the movement control unit 143 need periodic calibration, execution of a periodic compatibility test may be set for the purpose of determining the timing of the calibration. In addition, the period of the compatibility test may be set on the basis of the frequency of maintenance required for the mobile device 140, the driving assistance processing unit 142, the sensor 141, or the movement control unit 143 defined by law. Moreover, the period of the compatibility test may be variable depending on the area, time of day, and weather. For example, from the accident history, in an area where the accident occurrence frequency is high, execution of the compatibility test with a short period is set. In addition, execution of the compatibility test with a short period may be qualitatively set in a time zone at night rather than in the daytime, or in a rainy or snowy weather rather than in a sunny weather.

Subsequently, the registration permission determination unit 115 determines whether or not the mobile device 140 has entered the specific region (step S706). In a case where the mobile device 140 has not entered the specific region, the processing of step S706 is periodically executed. On the other hand, in a case where the mobile device 140 has entered the specific region, the automated driving level management unit 116 determines whether or not the automated driving level set by the registered mobile device 140 is equal to or higher than the level 3 (step S707).

In a case where the automated driving level set by the registered mobile device 140 is not equal to or higher than the level 3, the processing ends. On the other hand, in a case where the automated driving level set by the registered mobile device 140 is equal to or higher than the level 3, the compatibility test execution instruction unit 117 instructs the mobile device 140 to execute the compatibility test (step S708). Thereafter, the processing of step S706 is periodically executed, and it is determined whether or not the mobile device 140 has entered the specific region.

Note that, in the example of FIG. 12, an example is illustrated in which in a case where the automated driving level is the level 5 in S701, the compatibility test execution instruction unit 117 gives an instruction on the execution of the compatibility test at the time of registration, but the present invention is not limited to this example. For example, in a case where the area in which the registration request has been received is a specific place for the level 4 as the automated driving level at which the system can perform all operations, the compatibility test execution instruction unit 117 may give an instruction on the execution of the compatibility test in a case where the automated driving level is equal to or higher than the level 4. Moreover, in a case where the area in which the registration request has been received is a specific place for the level 3 as the automated driving level at which the system can perform all operations, the compatibility test execution instruction unit 117 may give an instruction on the execution of the compatibility test in a case where the automated driving level is equal to or higher than the level 3.

Figure 13:
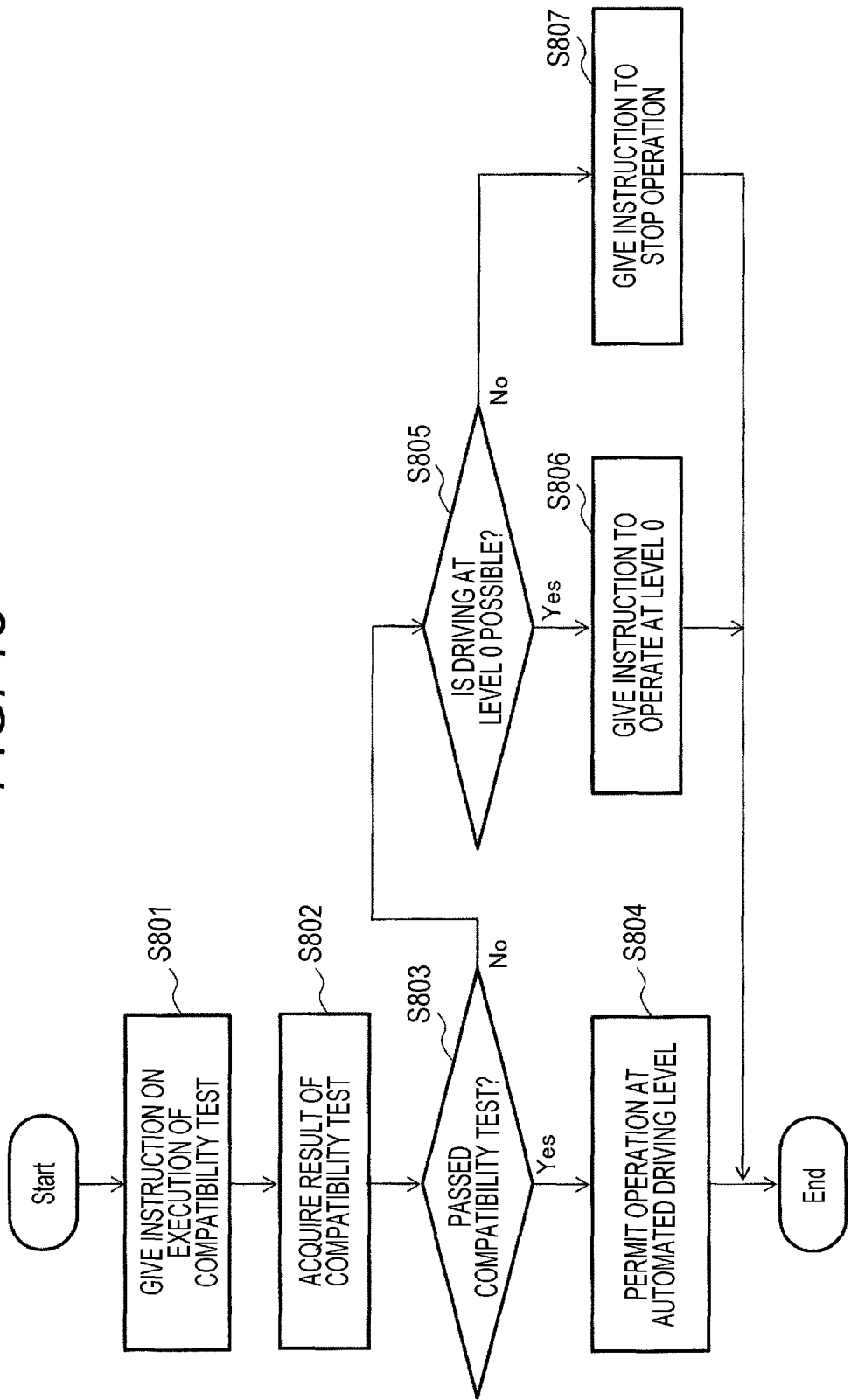
FIG. 13 is a flowchart illustrating another example of a part of the operation management processing.

FIG. 13 is a flowchart illustrating another example of a part of the operation management processing. Here, a processing flow regarding determination of a compatibility test result will be described.

When the compatibility test execution instruction unit 117 instructs the mobile device 140 to execute the compatibility test (step S801), thereafter, the compatibility test result acquisition unit 118 acquires the result of the compatibility test from the mobile device 140 (step S802).

Subsequently, the compatibility test determination unit 119 determines whether the mobile device 140 has passed the compatibility test (step S803). In a case where the mobile device 140 has passed the compatibility test, the registration permission determination unit 115 permits the mobile device 140 to operate at the registered automated driving level (step S804).

On the other hand, in a case where the mobile device 140 fails the compatibility test, the registration permission determination unit 115 determines whether or not the mobile device 140 can drive at the level 0 (step S805). This is because, for example, the mobile device 140 assumed to perform the automated driving at the level 5 may be designed not assuming that a person is involved in the driving.

In a case where the mobile device 140 can drive at the level 0, the registration permission determination unit 115 instructs the mobile device 140 to operate at the level 0 (step S806).

On the other hand, in a case where the mobile device 140 cannot drive at the level 0, the registration permission determination unit 115 instructs the mobile device 140 to stop the operation (step S807). For example, unlike the automated driving of the level 3, the automated driving at the level 4 is not required to be operated by the driver in an emergency, and thus it is assumed not to have the performance to be driven by a person. That is, there may be a case where the mobile device 140 compatible with the automated driving at the level 4 cannot operate at the level 0. Accordingly, the operation of the mobile device 140 is stopped. Here, in a case where the vehicle traveling in front of the mobile device 140 is a vehicle compatible with platooning via the V2X communication and the mobile device 140 has a capability of platooning, the registration permission determination unit 115 may instruct the mobile device 140 to travel by platooning according to the vehicle interval with the vehicle traveling in front.

Note that, in accordance with the instruction to stop the operation, operation assistance for stopping at a place where the operation of the other vehicle is not interfered may be performed. For example, this operation support is a remote driving operation by the driving management device 110. Furthermore, the operation management processing illustrated in FIG. 13 may be performed by the driving assistance processing unit 142 mounted on the mobile device 140 in an autonomous and distributed manner instead of the driving management device 110.

In addition, in a case where the mobile device 140 has not passed the compatibility test in step S803, the compatibility test execution instruction unit 117 may give an instruction on execution of the compatibility test of a level (for example, the level 5 to the level 4) one level lower before the processing of step S805 is performed. In this case, the compatibility test determination unit 119 determines the compatibility test result, so that automated driving at a level higher than the level 0 can be supported as much as possible.

According to the embodiment described above, the automated driving level of each mobile device 140 is registered in the driving management device 110 in advance before traveling. Furthermore, the arithmetic model is different for each automated driving level, and each mobile device 140 cannot start traveling unless possessing an appropriate arithmetic model. As described above, since the automated driving level and the arithmetic model of each mobile device 140 are collectively managed by the driving management device 110, driving assistance can be performed according to different automated driving levels.

Note that, in the present specification, the mobile device 140 is described by taking a vehicle traveling on a road as an example, but the scope of the technology disclosed in the present specification is not limited thereto. The mobile device 140 can be applied to an aircraft that floats or travels on the ground or in the air, or an unmanned aerial vehicle (UAV) represented by a drone. Here, the aircraft may include a small aircraft that is also referred to as a flying car. In a case where the mobile device 140 is these aircraft, a spatial area including information in the height direction is applied as the area. Moreover, the definition and classification of the automated driving level are examples, and for example, finer classification is possible.

Furthermore, the processing executed in each of the driving management device 110, the server 120, and the mobile device 140 described above can be achieved by software (program) executed by a central processing unit (CPU), a graphics processing unit (GPU), or the like. In the case of being achieved by software, a program for achieving at least some functions of the driving management device 110, the server 120, and the mobile device 140 may be stored in a recording medium such as a semiconductor memory, a hard disk, a flexible disk, or a CD-ROM, and may be read and executed by a computer. In addition, the program that implements at least some of the functions of the driving management device 110, the server 120, and the mobile device 140 may be dynamically downloaded from the base station device 130 or the RSU and stored in the above-described recording medium.

Note that not all the processes of the driving management device 110, the server 120, and the mobile device 140 may be executed by software, but some processes may be executed by hardware such as a dedicated circuit. Furthermore, the driving management device 110 or the server 120 may be implemented in a distributed manner in a plurality of devices, for example, a cloud server. Here, an implementation form may include a dynamic implementation by virtualization. Moreover, the cloud server may include a concept of an edge server.

In the above description, a system means a set of a plurality of components (devices, modules (parts), and the like), and it does not matter whether or not all the components are in the same housing. Therefore, both of a plurality of devices housed in separate housings and connected via a network and a single device in which a plurality of modules is housed in one housing are systems.

Note that the present technology can have configurations as follows.

(1) An information processing system including one or more mobile devices capable of setting an automated driving level, and an external network device capable of communicating with the mobile devices, in which
the external network device includes
a communication device that communicates with the mobile device,
an arithmetic model determination device that determines an arithmetic model corresponding to the automated driving level and provides the arithmetic model to the mobile device via the communication device, and
a registration determination device that determines whether or not registration of the automated driving level is possible on the basis of information regarding possession of the arithmetic model, and gives a notification of registration permission to the mobile device via the communication device, and
the mobile device includes
an arithmetic model request unit that requests the arithmetic model from the arithmetic model determination device, and causes the information to be transmitted to the registration determination device when the requested arithmetic model is provided, and a movement control unit that starts movement control based on the automated driving level permitted to be registered when the notification is received from the registration determination device.

(2) The information processing system according to (1), in which the communication device is a base station device that wirelessly communicates with the mobile device.

(3) The information processing system according to (2), in which the arithmetic model determination device is a server including a communication unit that communicates with the mobile device via the base station device.

(4) The information processing system according to (2) or (3), in which the registration determination device is a driving management device including a communication unit that communicates with the mobile device via the base station device.

(5) The information processing system according to any one of (1) to (4), in which the mobile device further includes an arithmetic model determination unit that confirms an expiration date or a valid area of a first arithmetic model owned, and the arithmetic model request unit requests a second arithmetic model whose date or area is valid according to a confirmation result of the arithmetic model determination unit.

(6) The information processing system according to (5), in which the mobile device further includes an arithmetic model storage unit that stores the arithmetic model, and the first arithmetic model is updated to the second arithmetic model in the arithmetic model storage unit.

(7) The information processing system according to any one of (1) to (4), in which the registration determination device further includes a compatibility test execution instruction unit that determines necessity of a compatibility test according to the automated driving level and instructs the mobile device to execute the compatibility test according to a determination result.

(8) The information processing system according to any one of (1) to (4), in which the registration determination device further includes a registration permission determination unit that gives an instruction on a setting change of the automated driving level on the basis of a position of the mobile device, and the mobile device further includes an automated driving level setting unit that changes a setting of the automated driving level on the basis of the instruction from the registration permission determination unit.

(9) The information processing system according to (8), in which the arithmetic model request unit requests the arithmetic model corresponding to the automated driving level with changed setting from the arithmetic model determination device, and updates a first arithmetic model owned to a second arithmetic model acquired from the arithmetic model determination device.

(10) The information processing system according to (7), in which the compatibility test execution instruction unit instructs the mobile device to execute the compatibility test that is periodic in a case where the automated driving level is equal to or higher than a predetermined level.

(11) An information processing device, including:

an arithmetic model request unit that requests and acquires an arithmetic model corresponding to an automated driving level set in a mobile device; and a movement control unit that, when the automated driving level is permitted to be registered on the basis of information regarding possession of the arithmetic model, starts movement control of the mobile device on the basis of the automated driving level permitted to be registered.

(12) The information processing device according to (11), further including a registration request processing unit that requests an external network device capable of communicating with the mobile device to register the automated driving level, in which the arithmetic model request unit requests the arithmetic model from the external network device, and acquires the arithmetic model from the external network device.

(13) The information processing device according to (12), further including a driving assistance processing unit that controls the movement control unit on the basis of a result of calculating detection data of a sensor provided in the mobile device by the arithmetic model, in which the arithmetic model is determined by the external network device on the basis of at least one or more of detection content of the sensor, a type of the mobile device, or performance of the driving assistance processing unit.

(14) The information processing device according to any one of (11) to (13), further including an arithmetic model determination unit that confirms an expiration date or a valid area of a first arithmetic model owned, in which the arithmetic model request unit requests a second arithmetic model whose date or area is valid according to a confirmation result of the arithmetic model determination unit.

(15) The information processing device according to (14), further including an arithmetic model storage unit that stores the arithmetic model, in which the first arithmetic model is updated to the second arithmetic model in the arithmetic model storage unit.

(16) An information processing method, including:

by one or more mobile devices capable of setting an automated driving level, requesting an arithmetic model corresponding to the automated driving level from an external network device;

by the external network device, determining the arithmetic model and providing the arithmetic model to the mobile device;

by the mobile device, transmitting information regarding possession of the arithmetic model to the external network device;

by the external network device, determining whether or not registration of the automated driving level is possible on the basis of the information, and giving a notification of registration permission to the mobile device; and by the mobile device, starting movement control based on an automated driving level permitted to be registered when the notification is received.

The above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scopes thereof.

REFERENCE SIGNS LIST

100 Driving assistance system
110 Driving management device
117 Compatibility test execution instruction unit
115 Registration permission determination unit
120 Server
130 Base station device
140 Mobile device
141 Sensor
142 Driving assistance processing unit
143 Movement control unit
145 Registration request processing unit
146 Arithmetic model request unit
147 Automated driving level setting unit
148 Arithmetic model determination unit
149 Arithmetic model storage unit

The invention claimed is:

1. An information processing system, comprising:
at least one mobile device configured to set, for the at least one mobile device, an automated driving level of a plurality of automated driving levels, wherein the at least one mobile device includes a sensor configured to acquire data associated with the at least one mobile device; and
an external network device configured to communicate with the at least one mobile device, wherein
the external network device includes:
a communication device configured to communicate with the at least one mobile device; and
a first processor configured to:
determine a first arithmetic model of a plurality of arithmetic models based on the set automated driving level, wherein the first arithmetic model is a neural network model;
transmit the first arithmetic model to the at least one mobile device via the communication device;
receive first information and second information from the at least one mobile device via the communication device, wherein
the first information includes the acquired data of the sensor, and
the second information includes information associated with the first arithmetic model possessed by the at least one mobile device;
evaluate, based on the acquired data of the sensor, a detection accuracy of the sensor corresponding to the set automated driving level;
permit registration of the set automated driving level based on the second information and the evaluated detection accuracy of the sensor; and
transmit a notification of the registration permission to the at least one mobile device via the communication device; and
the at least one mobile device includes:
a second processor configured to:
request the first arithmetic model from the external network device;
receive the first arithmetic model from the external network device based on the request;
transmit the first information and the second information to the external network device based on the first arithmetic model;
receive the notification from the external network device; and
control movement of the at least one mobile device based on the set automated driving level, the first arithmetic model, and the received notification.

2. The information processing system according to claim 1, wherein
the communication device is a base station device, and
the base station device is configured to wirelessly communicate with the at least one mobile device.

3. The information processing system according to claim 2, wherein
the external network device is a server, and
the server includes a communication unit configured to communicate with the at least one mobile device via the base station device.

4. The information processing system according to claim 2, wherein
the external network device is a driving management device, and
the driving management device includes a communication unit configured to communicate with the at least one mobile device via the base station device.

5. The information processing system according to claim 1, wherein the second processor is further configured to:
confirm one of a first expiration date of the first arithmetic model or a first valid area of the first arithmetic model; and
request a second arithmetic model of the plurality of arithmetic models with one of a second expiration date or a second valid area based on a result of the confirmation.

6. The information processing system according to claim 5, wherein the at least one mobile device further includes an arithmetic model storage unit configured to:
store the first arithmetic model; and
update the first arithmetic model to the second arithmetic model.

7. The information processing system according to claim 1, wherein the first processor is further configured to instruct the at least one mobile device to execute a compatibility test based on the set automated driving level.

8. The information processing system according to claim 7, wherein the first processor is further configured to instruct the at least one mobile device to execute the compatibility test periodically based on a determination that the set automated driving level is equal to or higher than a specific level.

9. The information processing system according to claim 7, wherein
the second processor is further configured to execute, based on the instruction of the first processor, the compatibility test of at least one of the sensor or the second processor, and
the compatibility test is based on an application of a specific neural network model on the acquired data of the sensor.

10. The information processing system according to claim 1, wherein
the first processor is further configured to instruct a change in a setting of the set automated driving level based on a position of the at least one mobile device, and
the second processor is further configured to change the setting of the set automated driving level based on the instruction from the first processor.

11. The information processing system according to claim 10, wherein the second processor is configured to:
  request a second arithmetic model of the plurality of arithmetic models corresponding to the set automated driving level with the changed setting; and
  update the first arithmetic model to the second arithmetic model.

12. The information processing system according to claim 1, wherein
  the at least one mobile device includes:
    a power system;
    a braking device; and
    a steering device; and
  the first processor is further configured to:
    receive third information from the at least one mobile device, wherein the third information includes specific data associated with one of the power system of the at least one mobile device, the braking device of the at least one mobile device, or the steering device of the at least one mobile device; and
    generate, based on the third information, the first arithmetic model corresponding to the set automated driving level.

13. An information processing device, comprising:
  a mobile device configured to set, for the mobile device, an automated driving level of a plurality of automated driving levels, wherein the mobile device includes a sensor configured to acquire data associated with the mobile device;
  a second processor configured to:
    acquire from an external network device a first arithmetic model, of a plurality of arithmetic models, corresponding to the automated driving level, wherein the first arithmetic model is a neural network model;
    receive, from the external network device, a notification of a permission to register the automated driving level, wherein
      the registration is permitted based on second information and a detection accuracy of the sensor
      the detection accuracy of the sensor is evaluated, based on first information, by the external network device,
      the first information includes the acquired data, of the sensor, corresponding to the set automated driving level, and
      the second information includes information associated with the first arithmetic model possessed by the mobile device; and
    control movement of the mobile device based on the set automated driving level, the first arithmetic model, and the received notification.

14. The information processing device according to claim 13, wherein the second processor is further configured to:
  request the external network device that communicates with the mobile device for the registration of the set automated driving level;
  request the first arithmetic model from the external network device; and
  acquire the first arithmetic model from the external network device.

15. The information processing device according to claim 14, wherein
  the second processor is further configured to:
    calculate the acquired data of the sensor; and
    control the movement of the mobile device based on the acquired data, and
  the external network device determines the first arithmetic model based on one of the acquired data, a type of the mobile device, or a performance of the second processor.

16. The information processing device according to claim 13, the second processor is further configured to:
  confirm one of a first expiration date of the first arithmetic model or a valid area of the first arithmetic model; and
  request a second arithmetic model of the plurality of arithmetic models with one of a second expiration date or a second valid area based on a result of the confirmation.

17. The information processing device according to claim 16, wherein the information processing device further comprises an arithmetic model storage unit configured to:
  store the first arithmetic model; and
  update the first arithmetic model to the second arithmetic model.

18. An information processing method, comprising:
  setting, by at least one mobile device, an automated driving level of a plurality of automated driving levels for the at least one mobile device;
  requesting, by the at least one mobile device, a first arithmetic model of a plurality of arithmetic models corresponding to the set automated driving level from an external network device;
  determining, by the external network device, the first arithmetic model based on the set automated driving level, wherein the first arithmetic model is a neural network model;
  transmitting, by the external network device, the first arithmetic model to the at least one mobile device;
  acquiring, by a sensor of the at least one mobile device, data associated with the at least one mobile device;
  transmitting, by the at least one mobile device, first information and second information to the external network device, wherein
    the first information includes the acquired data of the sensor, and
    the second information includes information associated with the first arithmetic model possessed by the at least one mobile device;
  evaluating, by the external network device, a detection accuracy of the sensor the set automated driving level, wherein the evaluation is based on the acquired data of the sensor;
  determining, by the external network device, a registration permission of the set automated driving level based on the second information and the evaluated detection accuracy of the sensor;
  transmitting, by the external network device, a notification of the registration permission to the at least one mobile device; and
  controlling movement of the at least one mobile device based on the set automated driving level, the first arithmetic model, and the notification.

* * * * *